(12) United States Patent
Chamberlain

(10) Patent No.: US 7,263,030 B2
(45) Date of Patent: Aug. 28, 2007

(54) SEISMIC DATA ACQUISITION SYSTEM

(75) Inventor: Donald G. Chamberlain, Calgary (CA)

(73) Assignee: ARAM Systems, Inc., Calgary, Alberta (CA)

( * ) Notice: Subject to any disclaimer, the term of this patent is extended or adjusted under 35 U.S.C. 154(b) by 0 days.

(21) Appl. No.: 11/219,981

(22) Filed: Sep. 6, 2005

(65) Prior Publication Data

US 2006/0018194 A1 Jan. 26, 2006

Related U.S. Application Data

(62) Division of application No. 10/162,243, filed on Jun. 4, 2002, now Pat. No. 6,977,867.

(60) Provisional application No. 60/296,089, filed on Jun. 5, 2001.

(51) Int. Cl.
*G01V 1/22* (2006.01)
*G01V 1/24* (2006.01)

(52) U.S. Cl. .................... 367/76; 367/78; 367/79; 367/80

(58) Field of Classification Search .................. 367/76, 367/77, 78, 79, 80, 37, 56, 86; 340/855.3
See application file for complete search history.

(56) References Cited

U.S. PATENT DOCUMENTS

| | | |
|---|---|---|
| 3,717,844 A | 2/1973 | Barret et al. |
| 3,878,502 A | 4/1975 | Rochelle |
| 3,914,732 A | 10/1975 | Brumleve et al. |
| 3,990,036 A | 11/1976 | Savit |
| 4,051,907 A | 10/1977 | Estes |
| 4,086,504 A * | 4/1978 | Ezell et al. .................... 367/77 |
| 4,147,222 A | 4/1979 | Patten et al. |
| 4,219,810 A | 8/1980 | Joosten |

(Continued)

FOREIGN PATENT DOCUMENTS

EP 0552 769 7/1993

(Continued)

OTHER PUBLICATIONS

Kevin Pelletier, "3-D Seismic Acquisition Techniques In Culturally Difficult Areas", RECORDER, vol. XXIV, No. 4, Apr. 1998, p. 24.

*Primary Examiner*—Jack Keith
*Assistant Examiner*—Scott A Hughes
(74) *Attorney, Agent, or Firm*—W. Allen Marcontell

(57) ABSTRACT

A seismic survey system having remote acquisition modules (RAMs) for acquiring seismic signals and communicating with a central recording system (CRU) via a network of cables, other RAMs, and line tap units (LTUs), arranged in a matrix of receiver lines and base lines. Each RAM cyclically converts analog signal values to digital, forming data packets. Interrogation commands emanating from the CRU and relayed with strategic delays by intervening LTUs and RAMs are received by the RAM. Each command causes the RAM to transmit a data packet. Strategic delays are set such that the transmission capacity of the line is best utilized. Power and frequency of transmission are selectable by the CRU to optimize performance. Cables contain multiple communication pairs. The network path between the RAM and the CRU is established from the CRU and altered in event of malfunction. All types of network elements are interconnectable. Recorded samples are synchronous.

21 Claims, 19 Drawing Sheets

U.S. PATENT DOCUMENTS

| | | | |
|---|---|---|---|
| 4,257,098 A * | 3/1981 | Lacy ........................... | 367/77 |
| 4,281,403 A | 7/1981 | Siems et al. | |
| 4,320,472 A * | 3/1982 | Fort ........................... | 367/79 |
| 4,712,199 A | 12/1987 | Rialan et al. | |
| 4,736,299 A | 4/1988 | Crice | |
| 4,807,200 A | 2/1989 | Montes et al. | |
| 5,077,698 A * | 12/1991 | Beauducel ................... | 367/79 |
| 5,231,251 A | 7/1993 | Hackett | |
| 5,465,270 A | 11/1995 | Beauducel et al. | |
| 5,550,787 A | 8/1996 | Rialan et al. | |
| 5,623,455 A | 4/1997 | Norris | |
| 5,627,798 A | 5/1997 | Siems et al. | |
| 5,724,241 A | 3/1998 | Wood et al. | |
| 5,822,273 A * | 10/1998 | Bary et al. ................... | 367/77 |
| 6,002,339 A | 12/1999 | Norris | |
| 6,002,640 A | 12/1999 | Harmon | |
| 6,308,137 B1 | 10/2001 | Underhill et al. | |
| 6,529,443 B2 | 3/2003 | Downey et al. | |
| 6,584,406 B1 | 6/2003 | Harmon et al. | |

FOREIGN PATENT DOCUMENTS

| | | |
|---|---|---|
| GB | 1 206 967 | 9/1970 |
| GB | 2 057 773 | 4/1981 |

* cited by examiner

CHANNELS PER RECEIVER LINE FOR 28 AWG DUAL TRANSMISSION CABLES

| | CHANNELS/RAM TO/CABLE | TO INTERVAL (m) | WEIGHT (lbs) | DISTANCE/RAM (m) | CABLE LENGTH (m) | 500 | 400 | 333 | 300 | 250 | 200 | 150 | 100 | TRANSMISSION RATE (mbits/sec) |
|---|---|---|---|---|---|---|---|---|---|---|---|---|---|---|
| | | | | | | \multicolumn{8}{c|}{MAXIMUM CHANNELS PER RECEIVER LINE} | |
| GROUP I | 8 | 75 | 36.04 | 600 | 300 | 336 | 416 | 504 | 560 | 672 | 840 | 1120 | 1680 | 2.75 |
| | 8 | 68 | 32.08 | 528 | 264 | 416 | 520 | 624 | 688 | 832 | 1040 | 1384 | 2080 | 3.5 |
| | 8 | 55 | 27.24 | 440 | 220 | 608 | 760 | 912 | 1008 | 1216 | 1520 | 2024 | 3040 | 5.0 |
| | 8 | 33 | 32.64 | 264 | 264 | 1216 | 1520 | 1824 | 2024 | 2432 | 3040 | 4048 | 6080 | 10.0 |
| | 8 | 28 | 28.24 | 224 | 224 | 1536 | 1920 | 2304 | 2560 | 3072 | 3840 | 5120 | 7680 | 12.5 |
| | 8 | 22 | 22.96 | 176 | 176 | 1984 | 2480 | 2976 | 3304 | 3968 | 4960 | 6608 | 9920 | 16.25 |
| | 8 | 17 | 18.56 | 136 | 136 | 1984 | 2480 | 2976 | 3304 | 3968 | 4960 | 6608 | 9920 | 16.25 |
| GROUP II | 6 | 88 | 31.78 | 528 | 264 | 396 | 492 | 594 | 660 | 792 | 990 | 1320 | 1980 | 3.5 |
| | 6 | 75 | 27.49 | 450 | 225 | 516 | 642 | 774 | 858 | 1032 | 1290 | 1716 | 2580 | 4.5 |
| | 6 | 66 | 24.52 | 396 | 198 | 648 | 810 | 972 | 1080 | 1296 | 1620 | 2160 | 3240 | 5.625 |
| | 6 | 55 | 20.89 | 330 | 165 | 864 | 1080 | 1296 | 1440 | 1728 | 2160 | 2880 | 4320 | 7.5 |
| GROUP III | 4 | 132 | 31.48 | 528 | 264 | 376 | 468 | 564 | 624 | 752 | 940 | 1252 | 1880 | 3.5 |
| | 4 | 110 | 26.64 | 440 | 220 | 536 | 668 | 804 | 892 | 1072 | 1340 | 1784 | 2680 | 5.0 |
| | 4 | 88 | 21.8 | 352 | 176 | 736 | 920 | 1104 | 1224 | 1472 | 1840 | 2452 | 3680 | 6.875 |
| | 4 | 75 | 35.4 | 300 | 300 | 936 | 1168 | 1404 | 1560 | 1872 | 2340 | 3120 | 4680 | 8.75 |
| | 4 | 66 | 31.44 | 264 | 264 | 1072 | 1340 | 1608 | 1784 | 2144 | 2680 | 3572 | 5360 | 10.0 |
| | 4 | 55 | 26.6 | 220 | 220 | 1344 | 1680 | 2016 | 2240 | 2688 | 3360 | 4480 | 6720 | 12.5 |

*FIG. 14*

SEISMIC DATA ACQUISITION SYSTEM

CROSS-REFERENCE TO RELATED APPLICATION

This application is a Division of U.S. patent application Ser. No. 10/162,243 filed Jun. 4, 2002 now U.S. Pat. No. 6,977,867 with claim to the benefit of the Jun. 5, 2001 filing date of U.S. Provisional Patent Application Ser. No. 60/296,089

BACKGROUND OF THE INVENTION

1. Field of the Invention

The present invention relates to seismic survey acquisition equipment. In particular, the invention relates to seismic survey equipment assembly combinations, survey data management strategies, operating software for carrying out the management strategies, the logistics of equipment deployment, and operation of equipment.

2. Description of Related Art

In principle, a seismic survey represents a voluminous data set containing detailed information that may be analyzed to describe the earth's layered geology as indicated by seismic wave reflections from acoustic impedance discontinuities at the layer interfaces. The analysis is influenced by elastic wave propagation velocities respective to the differences in strata density or elasticity. A seismic event such as is caused by the ignition of buried explosives in a shallow borehole or by a vibratory mechanism placed at the earth's surface is launched into the earth at a precisely known location and time. Seismic wave reflections of this manmade seismic event are detected by a multiplicity of transducers characterized in the art as geophones. The geophones are distributed in an orderly grid over the area of interest. The location of each geophone array is precisely mapped relative to the location of the seismic event. As the seismic wave from the timed event travels out from the source, reflections from that original seismic wave are returned to the surface where they are detected by the geophones. The geophones respond to the receipt of a wave with a corresponding analog electrical signal. These analog signals are received by data acquisition modules that digitize the analog signal stream for retransmission to a central recording unit. Among the significant data digitized by a data acquisition module may be the amplitude or strength of the reflected wave and the exact time lapse between the moment the event occurred and the moment an analog value of the geophone array is translated to a digital value.

In a single survey, there may be thousands of geophone signal sources. Consequently, the data flow must be orderly and organized. For example, the data acquisition modules transmit geophone signal values in digital data groupings called packets. Each packet contains a predetermined number of digital data bits representing, among other things, the digital value of the analog signal amplitude at the time that a seismic wave or increment thereof was translated to the digital value. The acquisition modules are programmed to transmit a data packet respective to a set of geophone channels at a predetermined bit rate. The variable data in a data packet represents an instantaneous snapshot of the analog signal flow from each geophone channel. There may be numerous individual geophone units transmitting respective analog signals to the data acquisition module on the same geophone signal channel.

Managing an orderly flow of this massive quantity of data to a central recording unit, often in a field survey truck, requires a plurality of digital signal processing devices. The data acquisition modules convert the geophone analog data to digital data and transmit the digital data packets along receiver lines or radio transmission channels. There may be numerous data acquisition modules transmitting respective data packets along a single receiver line. Among the functions of each data acquisition module is data packet transmission timing respective to the flow of data packets from other data acquisition modules transmitting respective data packets along the same receiver line. Typically, two or more receiver lines connect with base line units that further coordinate the data packet flow of numerous additional base line units into a base transmission line for receipt by a central recording unit.

Seismic surveying is often carried out under extremely inhospitable conditions of heat or cold, tropics or arctic, land or sea, desert or swamp. Regardless of the environment, the geophones must be positioned precisely relative to the seismic source event. Necessarily, manual placement of the geophones is normally required.

One of the many challenges facing seismic ground crews using cable connected systems is the initial decision of cable configuration(s). Data demands by geologists and investors are not always predictable. Seismic contractors must try to choose cable configurations that minimize weight for their workers in the field while keeping the number of line connectors to a minimum. However, prior art seismic systems are inflexibly designed as an integrated unit. If a remote data acquisition module is designed to operate in an 8-channel mode, a prior art system cannot readily be reconfigured to operate in a 6-channel mode notwithstanding that a particular survey task may be especially suited to the 6-channel mode. Prior art data acquisition modules are manufactured for a typical configuration with a fixed bit transmission rates and power settings that may not be adjusted. Consequently, bit transmission rates and power of transmission are mandated which are optimum only for a single type of equipment configuration.

Prior art systems rely upon interrogation commands from the central control module which are synchronously transmitted to the remote data acquisition modules, relying solely on the central system clock to control times of sampling.

An object of the present invention, therefore, is to assist a field observer to maximize an efficient use of the recording resources available to him for any particular task. Another object of the invention is to provide the greatest possible quantity of data of the highest possible quality for a given equipment configuration.

Another object of the present invention is a seismic system that may have its bit transmission rate tuned to optimize application of the available cable and other equipment to the seismic task objectives.

A further object of the present invention is to utilize deliberately asynchronous sampling of data at the remote units to increase efficiency of utilization of the network components.

Also an object of the present invention is the provision of a configurable seismic telemetry network having multiple data transmission paths available by remote selection. A further object of the invention is a remotely actuated termination point for data interrogation signals.

An additional object of the present invention is a seismic telemetry network in which all data carriers may function at the same bit transmission rate.

Still another object of the invention is a seismic telemetry network in which data transmission base lines may be operated at transmission rates greater or less than those of receiver lines when advantageous to the survey geometry. Prior art provides base lines operating at fixed transmission rates higher than the receiver line transmission rates. These prior art systems do not provide means to easily vary the bit rate of base line transmission to take advantage of differing requirements of seismic surveys or to match base line bit rate to the bit rate of the receiver line transmissions.

Other objects of the invention include an extension of receiver line take-out distances by optimizing data signal strength. Transmission electrical power influences the distance over which reliable telemetry can occur with higher power required for longer distances. Prior art does not provide ability to vary power as may be required to optimize communication for variable transmission distances over different cables, such as may be used within a project or on projects with differing requirements. Power conservation is an important consideration in prolonging battery life in a distributed seismic data acquisition system. Conservation of battery power in the distributed telemetry units by limiting transmission power to a minimum required for reliable communication is an object of this invention.

Receiver line take-out distances are also enhanced by an increase in data transmission efficiency. By an optimization of communication for a given receiver line take-out distance, the weight of equipment for a given system configuration is reduced.

Also an object of the invention is an increase in the time density of data transmission by minimizing wasted time between data packets.

A further object of the invention is to increase the efficiency of data telemetry by excluding information from the data packet that would identify the signal processing unit that originated the data and its time of creation (which reduces the amount of data that is to be transmitted) and to use the position of the data packet within the data stream to implicitly communicate data packet identity.

The capacity and option to selectively split the data-reporting route of portions of receiver lines is also an object of the present invention.

Another object of the invention is to provide network elements that are interconnectable and able to perform multiple functions thereby maximizing flexibility and efficiency of equipment utilization.

SUMMARY OF THE INVENTION

The foregoing objects of the invention and others not specifically stated above will be apparent to those of ordinary skill in the art from the following detailed description of the invention. Each Remote Acquisition Module (RAM) of the present invention is controlled by a Central Recording Unit (CRU) for cyclically converting analog seismic amplitude values to digital values. The digital values respective to a cycle are combined with other information as a digital data packet. Alternate RAMs in a receiver line transmit respective data packets along one of two communication lines to a Line Tap Unit (LTU) for transmission to a CRU. Data packets are transmitted from respective RAMs on command from interrogation signals. The interrogation signals are initiated from a CRU and retransmitted from the LTUs to the nearest RAM, which immediately begins transmitting data assembled since the previous transmission cycle. The interrogation signal, however, is delayed from retransmission to the next RAM until the data packet of the first RAM may be accommodated by the segment of communication conduit between the first RAM and the LTU. Interrogation signal retransmission is timed to receive the first data packet from the next RAM as transmission of the last data packet of the first RAM is completed. This pattern is repeated for all RAMs in a receiver line.

Transmission bit rate is adjusted to an appropriate value between about 6 to 12 megabits per second (mbps), for example, to accommodate the number of data packets to be transmitted along a given receiver line in a transmission cycle. Also considered in the transmission bit rate selection are the properties and physical characteristics of the cable between the RAMs in a receiver line series. However, the RAMs and base line units have 1 to 2 megabytes of data memory, for example, to accommodate a surplus of data generation. The data storage may be sufficient to store and entire sequence of shot data for later transmission. Alternatively, the data storage may be used to allow data transmission at a slower rate than the rate of data creation during the period of recording.

Transmission signal power is also adjusted to an appropriate value to both provide reliable communication between adjacent RAMs (and LTUs) and to minimize power consumption, thus prolonging battery life in the distributed units.

Base line transmission rate may be selected to be the same as the receiver line transmission rate to match capacity of the two types of communication, or base line transmission rate may be set higher or lower than receiver line transmission rate to take advantage of characteristics of the survey such as differing in-line and cross-line spacing and/or differing in-line and cross-line data volume requirements.

Collaterally, the system has the capacity to logically link all receiver lines with selectable communication conduit whereby a receiver line may be terminated where desired by commands issued from the central recording unit. The data packets from the RAMs isolated along one receiver line may be transmitted to another base line along another receiver line or they may be left unused.

Another characteristic of the system is RAM channel flexibility whereby any number of channels may be accommodated, up to the maximum capacity of a RAM. Consequently, the RAMs are not limited to a fixed communication scheme having a specific number of signal channels per RAM. RAMs constructed according to the present embodiment of the invention may be connected with 2, 4, 6, and 8 channel cable, for example.

The system further provides a flexible, multi-path network for connection of RAMs to the CRU. Universal cable connectors allow receiver line, base line and jumper cable to be connected to any type of device in the network, including RAMs, LTUs and the CRU. RAMs may be used as repeaters. Receiver line cable may be used as base line cable with reduced number of conduits. The system operator manipulates the network using a graphic user interface with a substantially true-scale map of the survey area that shows the location of physical obstacles and all seismic survey equipment items and their network connections. System software guides the operator in optimizing the equipment and network configuration, while overcoming physical barriers and sporadic equipment failures.

Bi-directionality of the RAMs and multi-directionality of LTUs, combined with looping of cables and logical breaks in receiver line cables, together with the inter-connectibility of cables and modules, provides adaptability not available in prior art.

Because the RAMs and LTUs are configurable from the CRU, necessary changes can be made to the network configuration without physical visits to remote line equipment modules when changing circumstances require alteration of the configuration. Multiple communication conduits within receiver-line and base-line cables provide opportunities to optimize use of transmission capacity and avoid shut down in case of disruption of some of the conduits. The multiple conduit base-line cable design is exploited in base-line splitting and rejoining to bypass obstacles and distribute capacity on both sides of obstacles.

The invention includes a new method of operating a seismic network which is deliberately asynchronous to allow more efficient telemetry of seismic data to the CRU and which utilizes independent clocks in the RAMs to more efficiently control the timing of samples. The asynchronous sampling is converted to synchronous sampling through a novel processing method effected by the RAMs and the CRU.

This processing method enables accurate and precise timing of seismic signal amplitude values and also overcomes the inaccuracy of the clocks in the individual RAMs. This method predicts time delays inherent in the network and measures RAM clock drift. Utilizing a highly accurate CRU clock and the sampled amplitude values, estimates of the amplitude values at the correct times are determined. This feature of the invention allows implementation of continuous recording as opposed to conventional intermittent recording as is useful and necessary in latest state-of-the-art land and marine seismic systems.

Another unique feature of the invention includes a definition of the seismic network by specifying the location and status of all system elements including RAMs, LTUs and the CRU. The network definition further includes a specification of the exact order of transmission of data packets by all active elements in the network, enabling an implicit determination of the identity of the RAM that originated a data packet and its time of creation. This method of implicit conveyance of information reduces the amount of data to be physically transmitted and improves network efficiency. A method of compensating for missing or surplus data packets is also provided to make the method of implicit identification of data packets more practicable.

BRIEF DESCRIPTION OF THE DRAWINGS

Other features and advantages of the invention will be recognized and understood by those of skill in the art from reading the following description of the preferred embodiments and referring to the accompanying drawings wherein like reference characters designate like or similar elements throughout the several figures of the drawings and wherein:

FIG. 14 is a tabulation of possible survey layout parameters available with the invention;

DESCRIPTION OF THE PREFERRED EMBODIMENTS

Figure 1A:
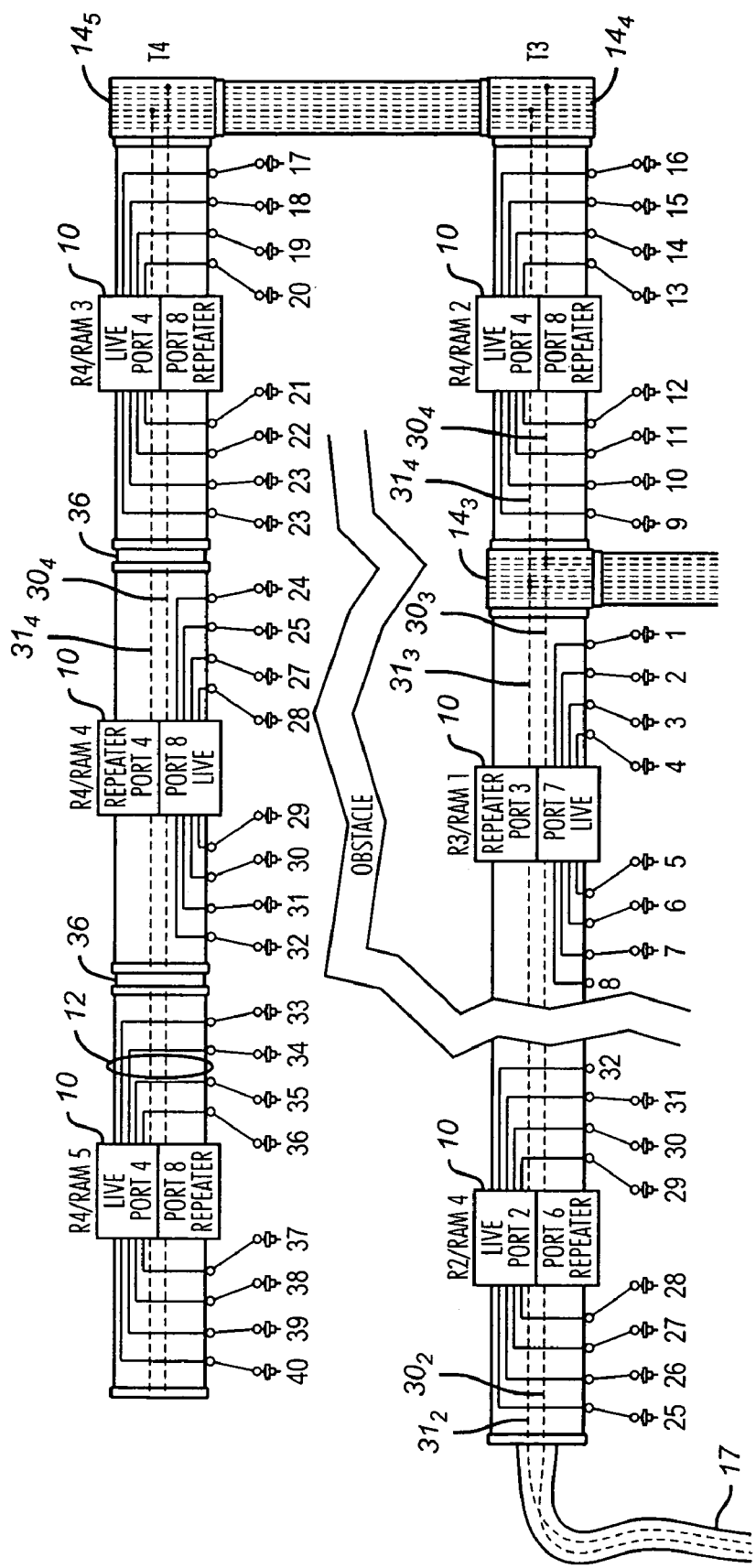
FIG. 1a is a half-plan schematic of the invention as deployed for a 3D survey.
Figure 1B:
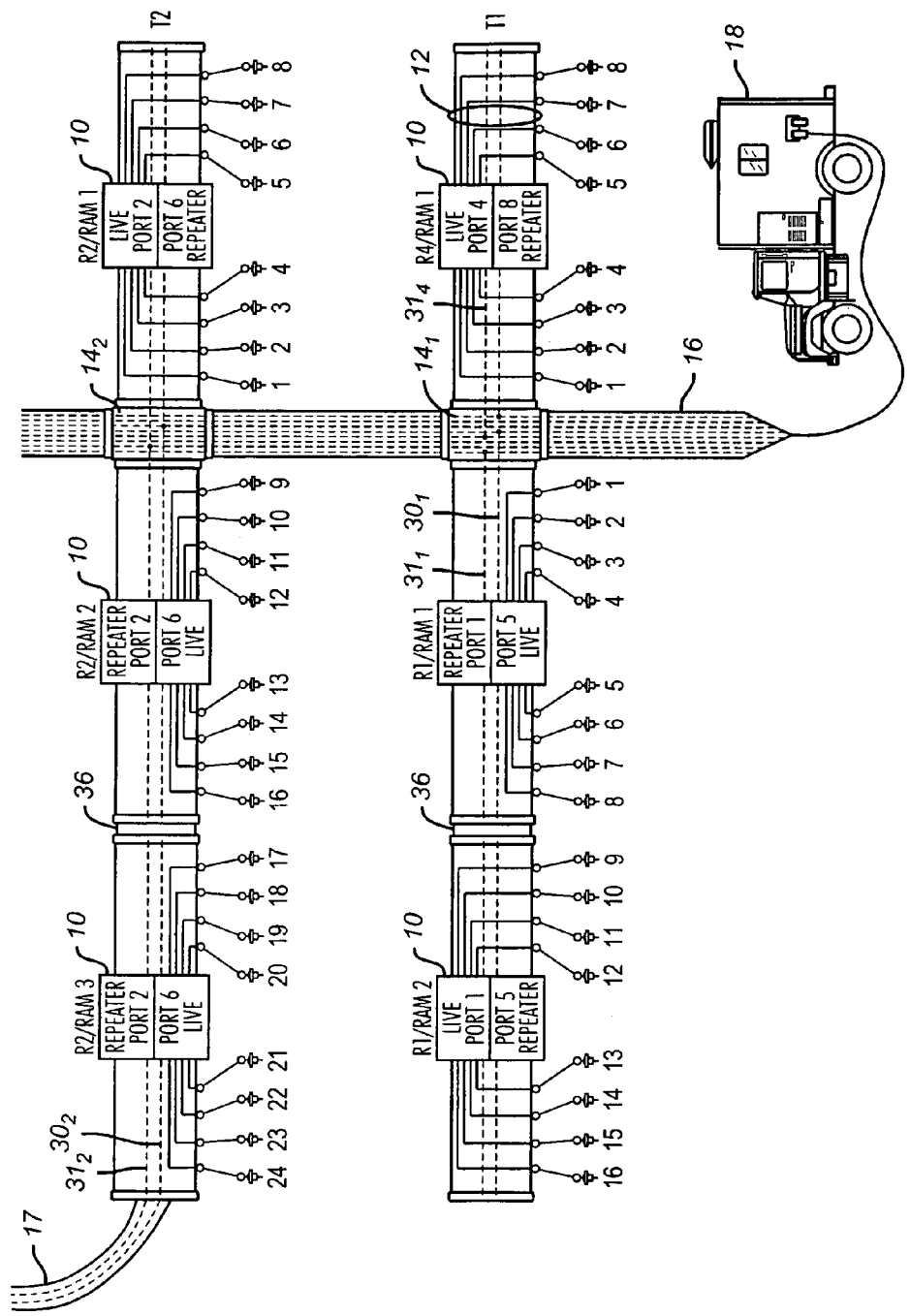
FIG. 1b is a half-plan schematic of the invention as deployed for a 3D survey.

FIG. 1 schematically illustrates a model seismic survey matrix according to the invention wherein geophones are distributed over the terrain of interest in an orderly manner of period and spacing. For this example, the geophones are aligned in four rows, T1, T2, T3 and T4. Row T3 is extended discontinuously across a physical obstacle such as a river or highway. Distributed along each of the geophone rows are three (for example) RAMs, 10. Construction of a RAM 10 will be described more fully with respect to FIGS. 5, 6 and 7.

Figure 3:
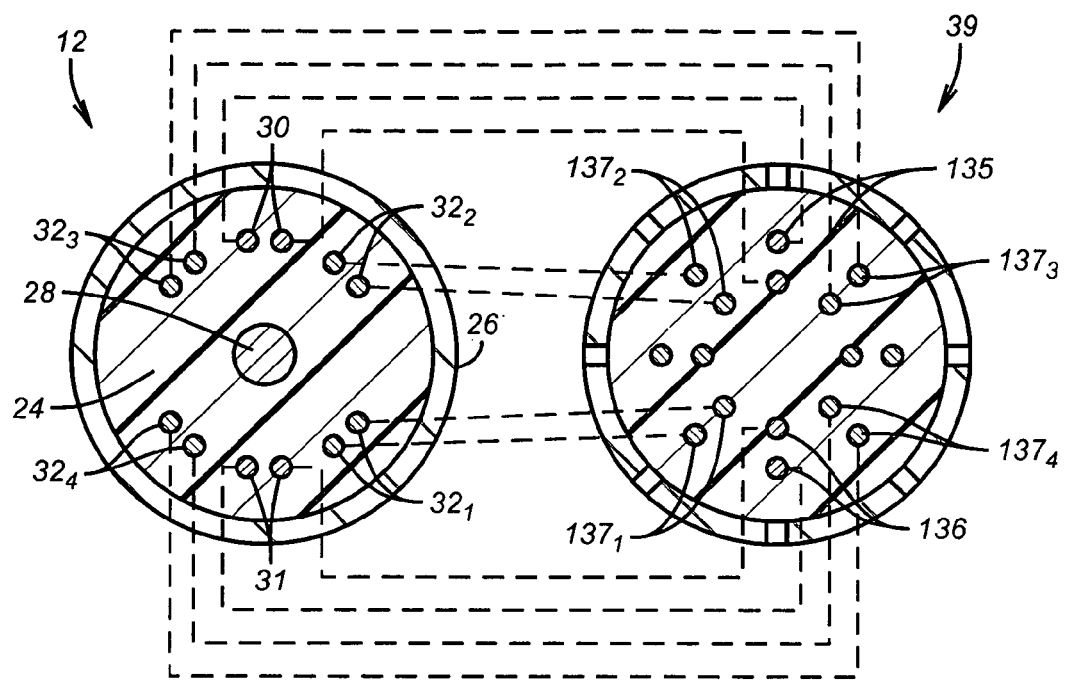
FIG. 3 is a cross-sectional view of an 8 channel receiver line cable and universal connector.

The RAMs are connected by two Receiver Line cables 12 respective to an "A" side and a "B" side of each RAM. See FIG. 5. As shown in cross-section by FIG. 3, a receiver line cable 12 comprises four pairs of geophone channel conduits 32 and two pairs of communication conduits 30 and 31, surrounding a stress carrying core element 28. The six pairs of receiver line conduit are aligned within an insulation annulus 24 and encased by a shield jacket 26. The receiver line cable is terminated at both ends with a universal cable connector 39. This cable connector allows connection of the receiver line cable to any RAM 10, LTU 14, BLU 38 or to the CRU 18 as shown in FIG. 1. The connector pins include one pair 135 for communication conduit 30, a second pair 136 for communication conduit 31, four pairs 137 for geophone channel conduits, and two unused pairs 138. The unused pairs are retained to allow use of a universal cable connector 39 for all types of cable in the system, including receiver line cable, base line cable and jumper cable types.

Referring to FIG. 1, the two receiver line cable sections respective to RAMs R-1/RAM 1 and R-1/RAM 2 in row T1 are mutually joined by a back-to-back connection 36. The same is true for the receiver line cables between R-2/RAM 2 and R-2/RAM 3 in row T2. Row T4 includes two back-to-back connectors 36. The back-to-back connectors 36 provide continuity between communication conduits 30 and 31 of connected receiver line cables 12 but not for the geophone channel conduits 32. Each of the four geophone channel conduits 32 in a single cable section respectively connects to only one RAM. Hence, each RAM receives up to eight geophone channels in this preferred embodiment example.

It is common industry practice for each geophone channel 32 to be connected with a plurality of geophones. Each of the geophones respective to a given channel 32 has a predetermined position relative to the seismic disturbance location whereby those commonly connected geophones all receive substantially the same subsurface reflection signal thereby (through summation) reinforcing the signal strength but receive substantially different seismic noise, thereby attenuating noise when summed.

Usually, not always, the geophone signals through the channels 32 are analog: analog-to-digital conversion being performed by the RAM as will subsequently be described more fully. However, A/D conversion by dedicated circuitry in individual geophone units is possible and is advantageous under certain circumstances.

Again referring to FIG. 1, LTUs $14_1$, $14_2$ and $14_3$ join the rows T1, T2 and T3 to a base line cable 16. The LTUs will be described more fully with respect to FIG. 9.

Figure 4:
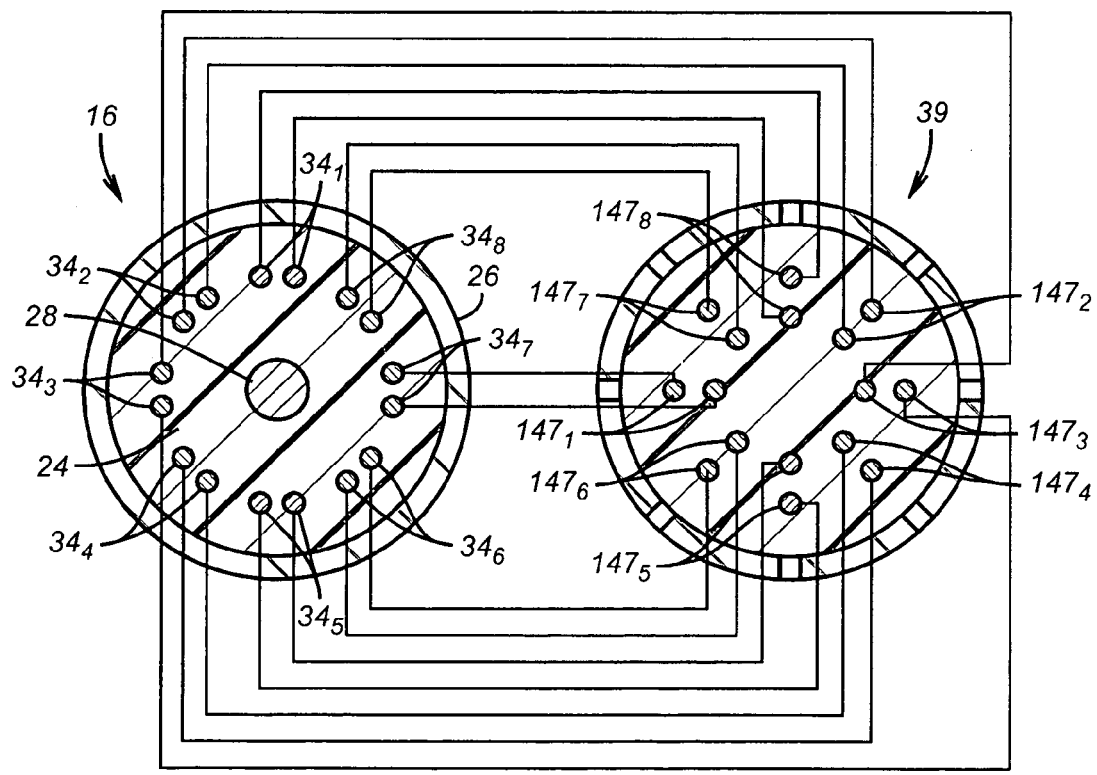
FIG. 4 is a cross-sectional view of an 8 channel base line cable and universal connector.

The base line cable 16 shown in cross-section by FIG. 4 comprises eight communication conduit pairs $34_{1-8}$ within an insulation annulus 24 and shield jacket 26. At the core of the assembly may be a stress carrying core 28. A universal cable connector 39 terminates both ends of a section of base line cable, allowing connection to any module in the system. Connector pins 147 for communication conduits 34 are shown. The universal connector 39 is physically identical to the connector used in the receiver line and jumper cable types allowing full inter-connectability of all equipment in the system.

Shown in FIG. 1 is a section of base line cable 16 joining LTUs $14_4$ and $14_5$. The use of base line cable 16 instead of receiver line cable 12 to connect RAMs that are on the same logical receiver line, as in this example, illustrates one aspect of the inter-connectability and adaptability of the system.

The eight communication conduits $34_{1-8}$ (FIG. 4) connect the geophone field matrix to a CRU 18 (FIG. 1) that is often carried in a vehicle for mobility. Depending on the data processing capacity of the CRU 18, one or more base lines 16 may serve a CRU 18. There are eight communication conduits in the base line cable 16 and two communication conduits. in each receiver line cable 12. Geophone data will be reported to the CRU 18 along the four receiver lines R-1 through R-4. Two of the eight communication conduits of the base line are made available to each active receiver line ensuring a one-to-one correspondence between receiver line and base line conduits that are utilized.

Specifically, receiver line R-1 serves RAMs R-1/RAM 1 and R-1/RAM 2. Data from geophone channels 1-8 connected to RAM R-1/RAM 1 is initially processed by that RAM and transmitted along receiver line communication conduit $30_1$ to base line communication conduit $34_5$. The data produced by geophone channels 9-16 of row T1 is processed by RAM R-1/RAM 2 and transmitted along receiver line communication conduit $31_1$ to base line communication conduit $34_1$.

Receiver line R-2 serves R-2/RAM 1, R-2/RAM 2, R-2/RAM 3 in row T2 and R-2/RAM 4 in row T3. The communication conduit $30_2$ and $31_2$ respective to the cable 12 end sections for rows T2 and T3 are linked by a jumper cable 17. The jumper cable is a cable that may contain only two communication conduits and no geophone channel conduits. It may be used to connect the ends of two receiver lines to form a loop. The data of geophone channels 9-16 in row T2 is transmitted by R-2/RAM2 and channels 17-24 in row T3 is transmitted by R-2/RAM 3 along receiver line communication conduit $30_2$ to base line communication conduit $34_6$. The data of geophone channels 25-32 in row T3 is transmitted by R-2/RAM 4 along receiver line communication conduit $31_2$ to base line communication conduit $34_2$. Also, geophone data from channels 1-8 of row T2 is transmitted by R-2/RAM 1 along communication conduit $31_2$ to base line communication conduit $34_2$.

Receiver line R-3 serves only geophones 1-8 in row T3 that are signal processed by R-3/RAM 1. The data is transmitted along receiver line communication conduit $30_3$ to base line communication conduit $34_7$.

Receiver line R4 serves R4/RAM 1 in row T1 and R4/RAM 2 in row T3. In row T4, receiver line R4 also serves R4/RAM 3, R4/RAM 4 and R4/RAM 5. Geophone channels 25-32 in row T4 are connected to R4/RAM 4 for data transmission along receiver line communication conduit $30_4$ to base line communication conduit $34_8$.

Receiver line communication conduit $31_4$ receives the data of geophone channels 1-8 in row T1, channels 17-24 in row T4 and channels 33-40 in row T4 for transmission to the CRU along base line communication conduit $34_4$. Receiver line communication conduit $30_4$ receives the data of geophone channels 9-16 in row T3 and channels 25-32 in row T4 for transmission to the CRU along base line communication conduit $34_8$.

Figure 2:
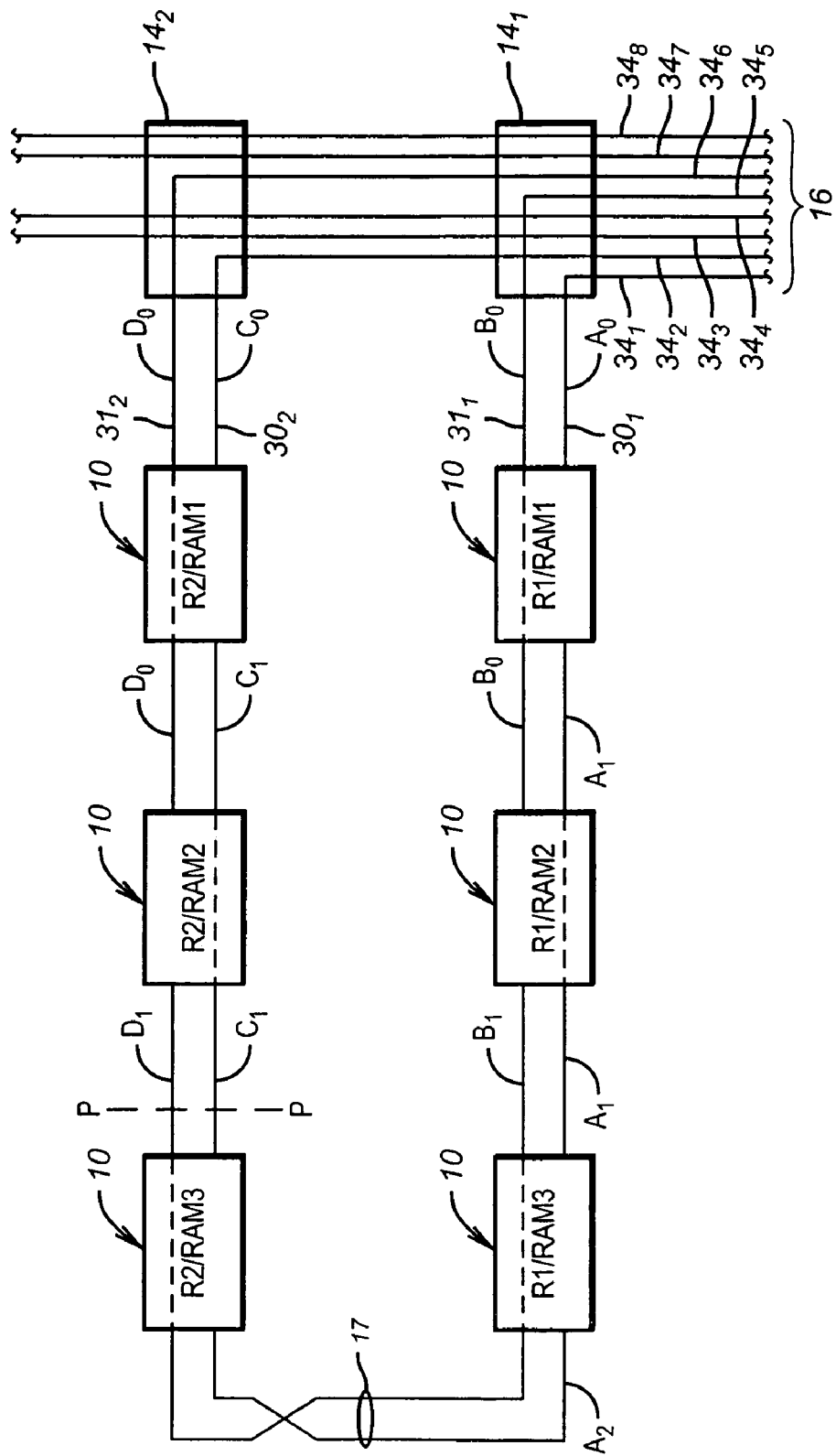
FIG. 2 is a detailed schematic of communication conduit between a pair of RAMs and geophones connected to the RAMs.

The invention embodiment of FIG. 2 illustrates two receiver lines R-1 and R-2 connected to a base line 16. The communication conduits $30_1$ and $31_1$ of receiver line R-1 connect R-1/RAM 1, R-1/RAM 2 and R-1/RAM 3 to base line communication conduits $34_1$ and $34_5$, respectively. The communication conduits $30_2$ and $31_2$ of receiver line R-2 connect R-2/RAM 1, R-2/RAM 2 and R-2/RAM 3 to base line communication conduits $34_2$ and $34_6$, respectively.

The RAMs 10, the LTUs 14, and the CRU 18 communicate by several types of digital data packets. The CRU 18 uses "Commands" to communicate with the line equipment comprising the RAMs 10, LTUs 14, BLUs 38 and repeaters. The line equipment sends Line Data back to the CRU. Each piece of equipment in the matrix system knows its orientation relative to the CRU. RAMs and LTUs recognize only Commands on their CRU side and Line Data on their line side.

Each RAM and LTU inherently has a logical "Command Side" and a "Line Side". There is no physical difference between the two sides, and either physical side may play either functional role. Definitively, however, the Command Side is the side closer to the CRU, normally, with a possible exception in the case where both physical sides are reachable by direct path from the CRU (requires looping of Receiver Lines by use of jumper cable 17). In the preferred embodiment, in a multipath environment as in FIG. 2, the Command Side of each device is determined by the CRU under the control of the operator. The CRU may switch the sides of a particular RAM or LTU as the survey progresses. This would be desirable, for example, in response to a communication failure in a particular cable segment. Another benefit of this ability to configure the directionality of the RAMs and LTUs is that when the CRU is moved to another location during the course of the survey, these modules are readily adapted to the new network configuration by the operator (without the necessity of a physical visit to the site of every RAM and LTU to be reconfigured, as in prior art).

In FIG. 2 the jumper cable 17 allows RAMs to communicate with the CRU from either side, and thus with a simple re-assignment of Command Side, an otherwise stranded RAM can be accessed by the CRU. The CRU controls the assignment of Command Side at system initialization by sending a "power-up" voltage to the device.

A digital data packet includes 204 bits per packet. Of this total, 8 data bits are reserved for a packet identification header, 192 bits are available for data use, and 4 bits are reserved for a data integrity check (checksum).

Commands may comprise, for example, of 32 bits of data for instructing one (or all) line equipment module to perform a given task. For example, the software may instruct a particular LTU to "power off" all RAMs on its "B" side. In another case, the software program may instruct all RAMs to switch into a low-power mode. Typically, the data bit structure of a Command data packet devotes the first 5 bits in the sequence to identification of a packet type e.g. Command, Interrogate Command or Line data. The sixth and seventh bits in a Command packet identify the type of device (RAM, LTU, etc.) to which the Command is being sent. The eighth bit in the Command preamble is a "global" bit that defines which devices are to act on the Command. One setting of the global bit addresses all devices of the selected type. Another setting incorporates the 16 following bits to specifically designate which devices are to act on the Command (Addressed Command). The last 8 bits in a Command packet define the Command being sent. When an LTU receives a command from the truck, it forwards the command simultaneously in three directions: out the "A" side, the "B" side and the "Line side" (unless the command is the special case of an Interrogate Command, which is treated differently). As each RAM on the spread receives a Command, it decides (based on the preamble and address bits) whether or not to act upon it, then sends it to the next device on the line.

Interrogate Commands are a special type of Command consisting of only 8 bits. The Interrogate Commands tell all devices to transmit Line data back to the CRU if primed to do so by previous Commands. In identifying an Interrogate Command, a device looks at only the first five bits of data and ignores the rest. Upon receiving an Interrogate Command, an LTU passes it to the RAMs on its "A" side and on its "B" side simultaneously, then begins transmitting toward the CRU the prior time sample "A" and "B" data which it has stored in memory. When the prior sample data has been transmitted for the "A" and "B" sides, the LTU, having purposely delayed sending the Interrogate Command out the "Line" side to minimize the gap in transmission of data towards the CRU, begins transmitting newly received "Line" side data (from the current sample) toward the CRU.

If an LTU does not receive enough responses within the programmed length of time, it inserts simulated data for the missing RAMs. If the LTU receives too many responses, it ignores those over the defined number. This method allows the CRU to identify the origin of data packets without resorting to use of explicit identification bits within the data packet. Once finished with the "A" side, the LTU repeats the process on the "B" side. Thereafter, the LTU sends the Interrogate Command out the "Line Side" side.

The LTU must transmit data toward the CRU in this order "A", "B" and "Line" sides. The order transmitted is the same order as would have occurred if it had actually interrogated the "A" side, the "B" side and the "Line" sides in turn. This strict adherence to the correct ordering of data packets for transmission toward the CRU is necessary for reducing data packet size through omission of identifying information, which improves efficiency of the telemetry.

A RAM or LTU may be used in Repeater Mode. In this mode its function is merely to receive Commands from the CRU and transmit them on the "Line" side to the next RAM or LTU. In Repeater Mode the RAM or LTU also receives data from the "Line" side and decodes and re-transmits the data toward the CRU.

When an active RAM (activated by previous Commands) receives an Interrogate Command, it begins sending its data towards the CRU. Just before finishing transmitting its data packet, (e.g. at a time calculated to minimize the time gap in transmission) the RAM passes the 8-bit Interrogate Command to the next RAM or LTU on the line.

Line Data packets consist of 204 data bits, for example. These packets include either analog-to-digital (e.g. geophone pulse or geophone noise) or status (e.g. battery voltage, serial number, etc.) information sent by line equipment to the recording system. The first 8 bits of a Line Data packet are the preamble. Bits 1-5 identify the block of information as data from the line as described previously. The next 3 bits identify what type of information is contained in the packet and how it was originated. For example, information may be real or simulated shot data, or device status.

The Data Word portion of a Line Data packet is 192 bits long and may include either shot data (24 bits from each of a RAM's eight channels) or status information. The remaining four bits of a Line Data packet are the Checksum Count. Before a RAM sends data to the recording system, it counts the number of "high" bits (or "1s") in the Data Word and writes the total here in binary format. The RAM counts in cycles of 16 (from 0 to 15), repeating the cycle until it finishes counting all high bits in the Data Word. For example, if a total of 20 bits were set "high" in the Data Word, the RAM would count to 15 then repeat the cycle, counting 16 as 0, 17 as 1, 18 as 2, 19 as 3 and 20 as 4. The Checksum Count in this case would be 4 (written as "0-1-0-0" in binary format).

After a RAM sends Line Data towards the CRU, each device along the way verifies it. When a device receives Line Data, it counts the high bits in the Data Word and compares that number with the data packet's Checksum Count. If these numbers do not match, the device notes the fact that it detected a transmission problem. The device then sends the data towards the CRU and waits for more data from the line or the CRU.

After collecting data, the system polls all devices on the line in order to determine which devices detected transmission problems and where to place error flags on the CRU-monitor display, for example.

Figure 5:
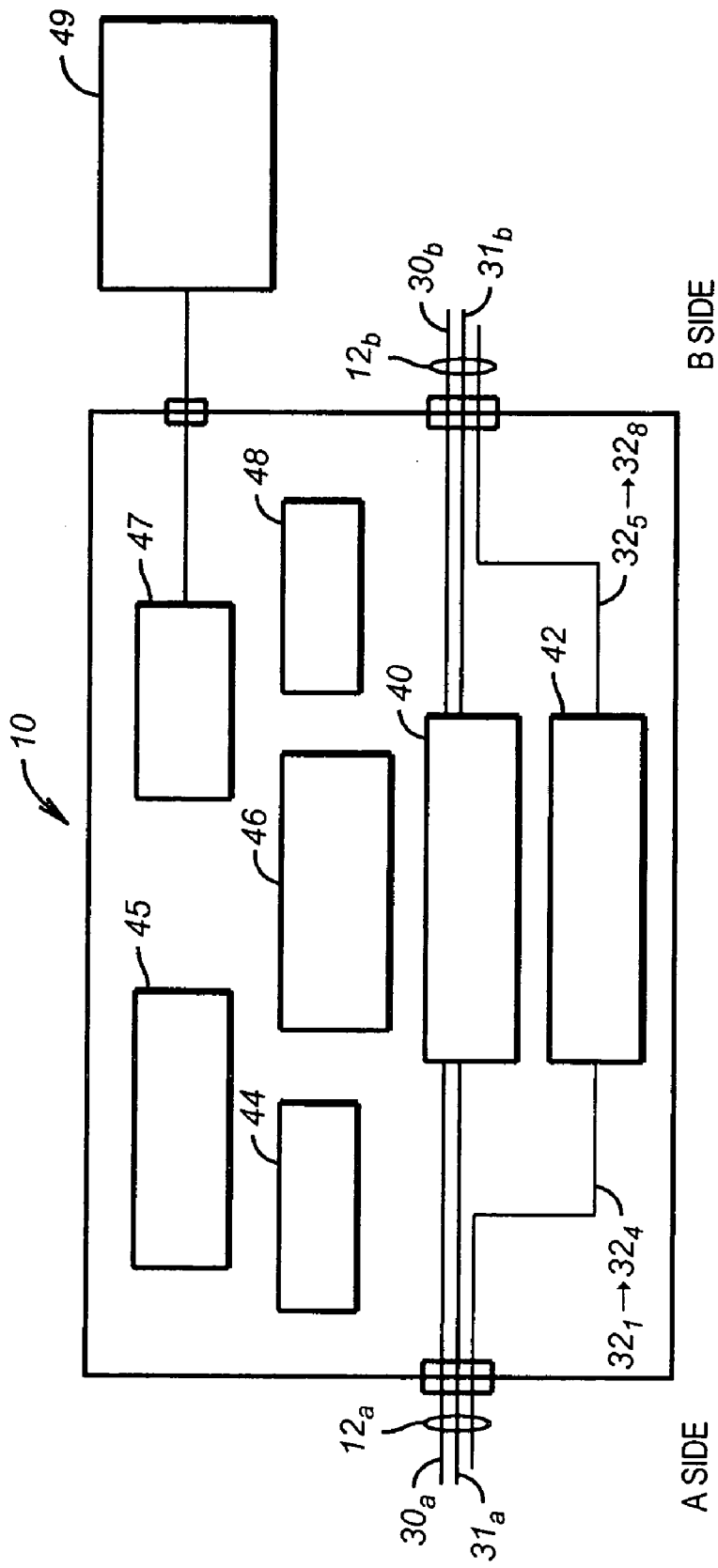
FIG. 5 is a functional schematic of a remote acquisition module (RAM)

The construction of a RAM 10, as is shown schematically by FIG. 5, comprises a communication module 40 and an analog-to-digital conversion module 42. The communication module 40 is supported by a clock circuit 44 and a Central Processing Unit (CPU) 46. The CPU includes a random access memory circuit 48. The communication module is energized by a power supply circuit 45 that manages the power demands upon an internal battery 47 and an external battery 49.

Figure 6:
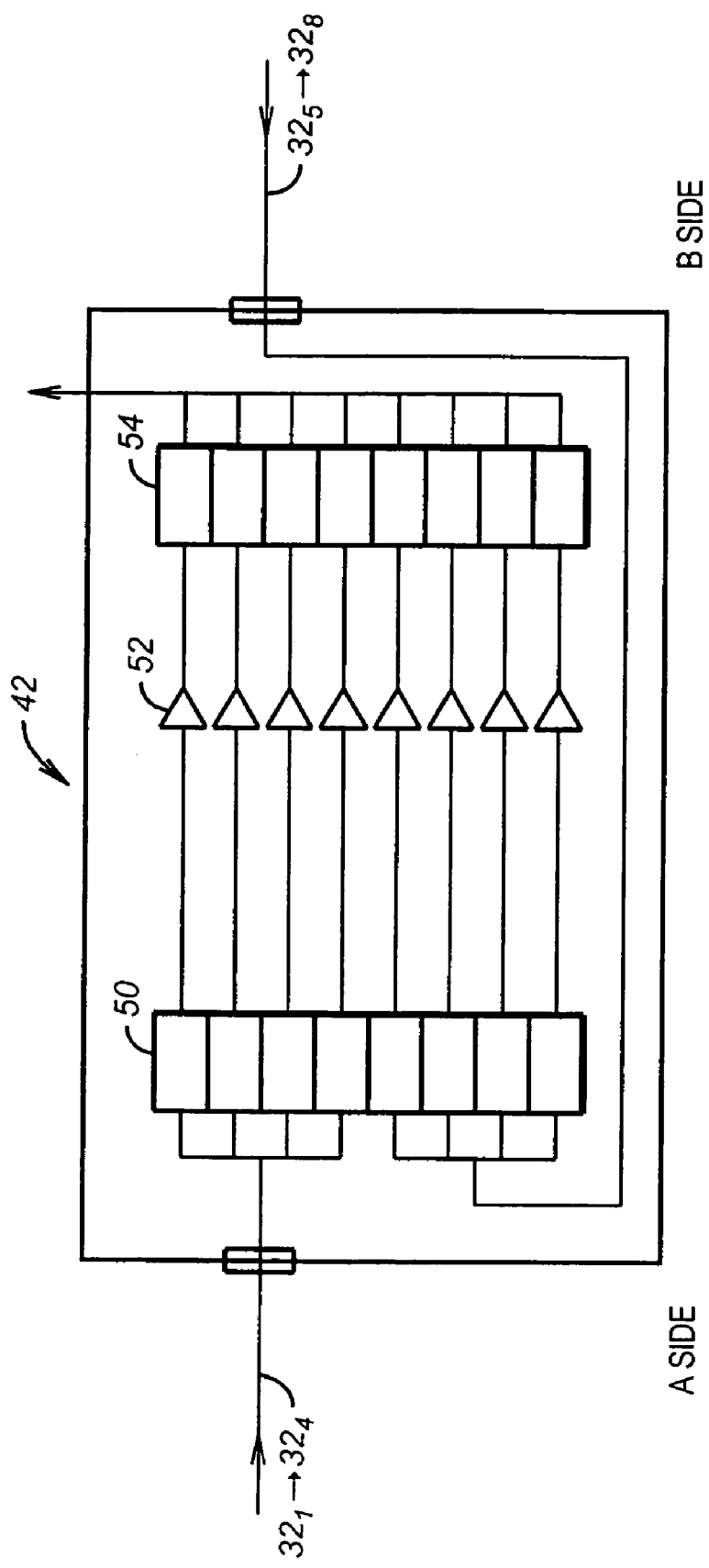
FIG. 6 is a functional schematic of an analog-to-digital conversion module

The schematic of analog-to-digital module 42 is shown more expansively by FIG. 6 to include, for each analog signal channel 32, a line surge isolator 50 for limiting stray voltage surges; an analog signal amplifier 52; and an analog-to-digital converter 54. Each analog-to-digital converter 54 transmits, upon receipt of an interrogation signal (called an Interrogate Command) from the communication module 40 (FIG. 5), its current geophone signal value to the communication module 40 for integration into a respective data packet.

Figure 7:
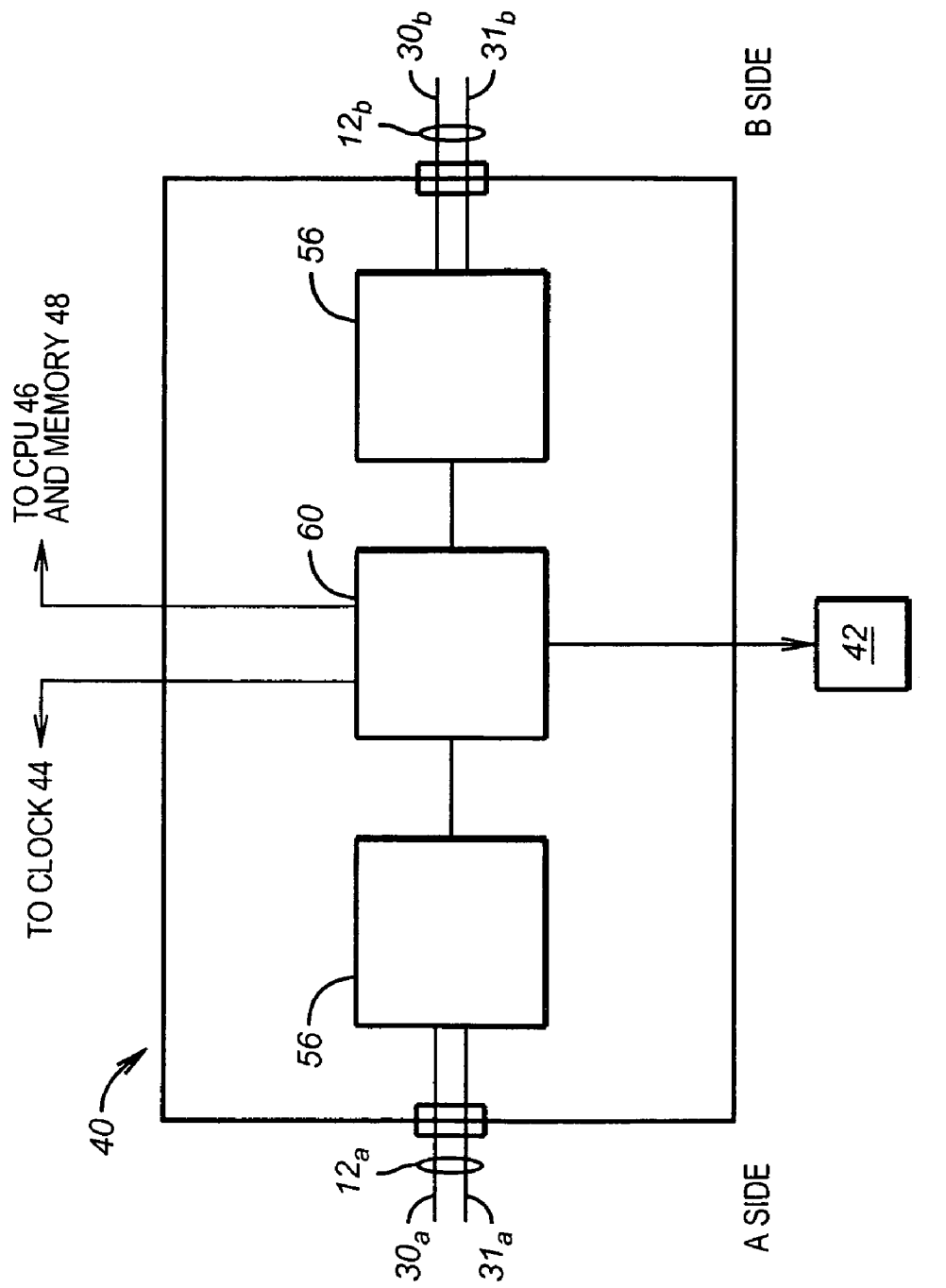
FIG. 7 is a functional schematic of a RAM communication module.

The communication module 40 of a RAM is schematically represented by FIG. 7 to comprise a line surge isolator 56 to limit voltage surges carried by the communication conduits 30 and 31. Digital values of the geophone signals are received from the analog-to-digital converter 42. The delivery of the digital signals is coordinated by the CPU 46 to encode a data packet onto one or the other of the communication conduits 30 or 31. Of the two communication conduits 30 and 31 in a receiver line 12, one is selected to receive the data packet transmission. The other communication conduit is decoded and retransmitted by a repeater circuit in the controller 60. Generally, each communication conduit 30 or 31 is logically connected for data packet input from alternate RAM units along a single receiver line. With respect to FIG. 2, for example, communication conduit $30_1$ may be connected to receive data packets from R-1/RAM 1 and R-1/RAM 3 whereas R-1/RAM 2 may report data packets along communication conduit $31_1$.

Under the software program control of the CPU 46, FIG. 5, and paced by the clock circuit 44, the controller 60 (FIG. 7) receives the digital signal values from the analog-to-digital conversion module 42 and combines that data with other header and with the checksum data to create a data packet. The seismic sampling rate is programmable from about 0.125 samples per ms to about 4 ms/sample, for example. Amplitude data are stored in the RAM's memory until an Interrogate Command is received, after which it transmits the amplitude data in the form of data packets along the Receiver Line toward the CRU.

Along the receiver lines 12, signal streams comprising a series of data packets are redirected into base-line 16 signal streams by either LTUs 14 or BLUs 38. The only difference between the two signal transmission units is an expanded data memory capacity for the BLUs 38. Both LTUs and BLUs potentially have signal processing capability.

Figure 9:
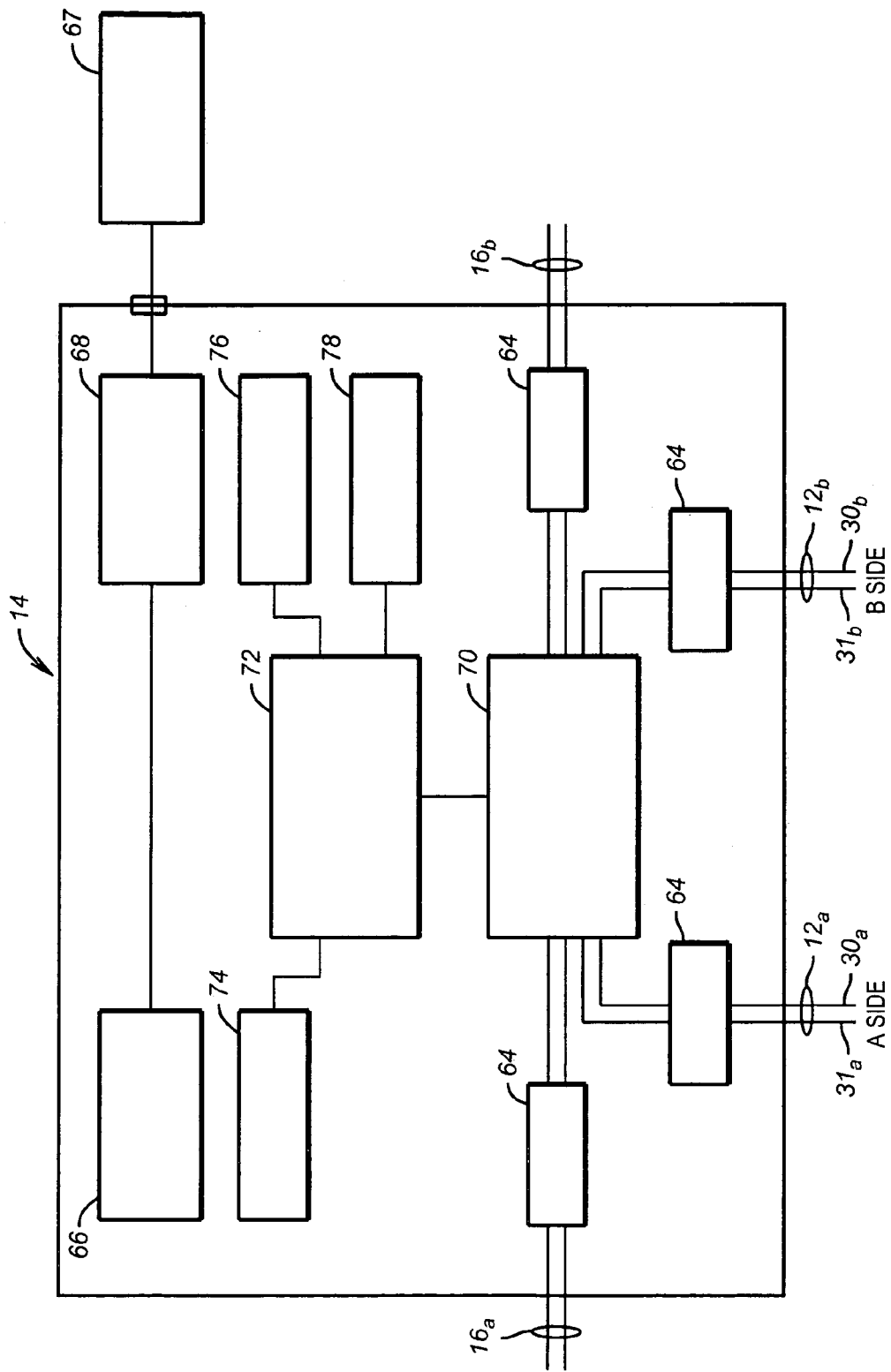
FIG. 9 is a functional schematic of a line tap unit (LTU)

With respect to the FIG. 9 schematic of an LTU 14, for example, the preferred embodiment of the invention comprises communication conduits for a pair of receiver lines $12_a$ and $12_b$ and communication conduits for a pair of base lines $16_a$ and $16_b$. Each of these ports is served by a remotely controlled line isolator circuit 64. In the normal operational mode, communication conduits $30_a$ and $31_a$ respective to receiver line $12_a$ and communication conduits $30_b$ and $31_b$ respective to receiver line $12_b$, are connected to the communication module 70. Similar to the RAM 10, the communication module 70 of LTU 14 is directed by a CPU 72 and paced by a clock circuit 74. The CPU 72 memory capacity is expanded by random access memory 76. A unit power distribution circuit 66 is supplied by internal batteries 68 and/or external batteries 67.

Figure 8:
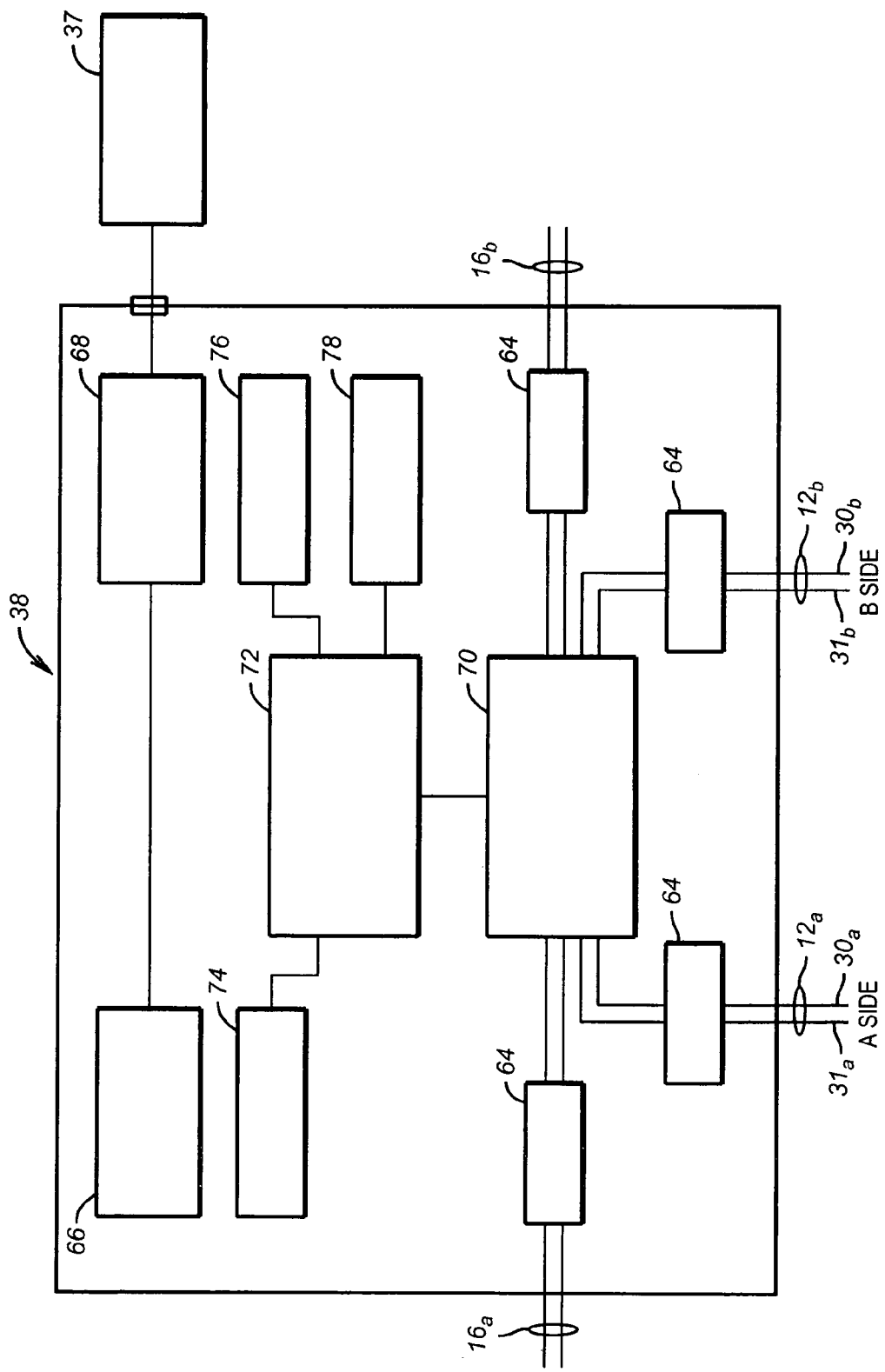
FIG. 8 is a functional schematic of a base line unit (BLU)

The BLU 38 of FIG. 8 is substantially the same as an LTU 14 of FIG. 9 except for bulk data storage capacity 78. A BLU may be used in place of an LTU, but not necessarily vice versa. In instances where the bulk data storage of the BLU is not required, the terms "LTU" 14 and "BLU" 38 are used interchangeably in this description of the preferred embodiments and in the following claims.

Figure 10:
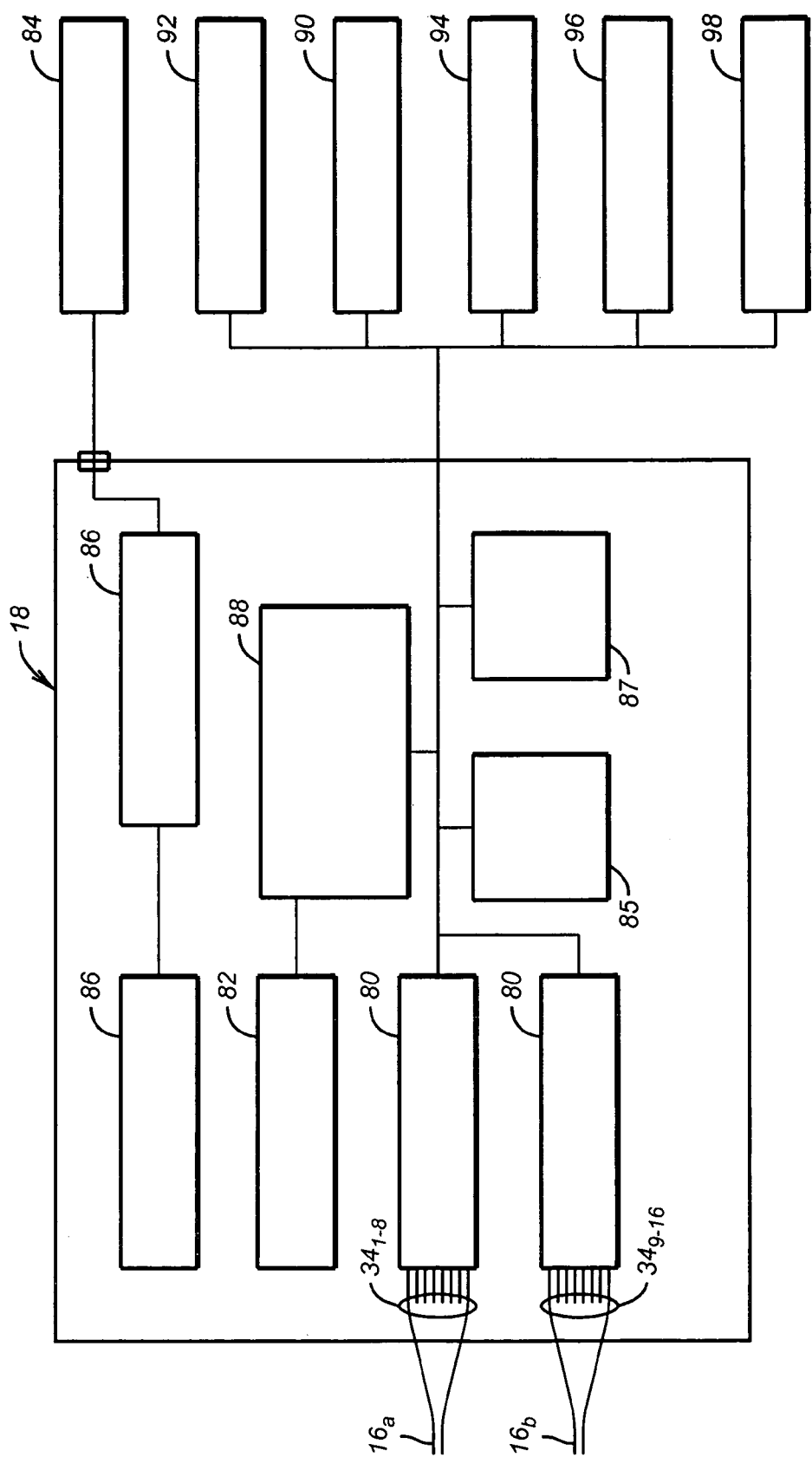
FIG. 10 is a functional schematic of a central recording unit (CRU)

The preferred embodiment of the CRU 18 is represented by FIG. 10, to include communication conduits for two base lines 16 that are served by respective communication modules 80. The communication modules 80 are paced by a clock 82 and externally powered by a source 84 such as a battery or generator. A power management circuit 86 includes both filtering and distribution. A CPU 88 controls the communication modules 80. The CPU 88 is functionally supported by a random access memory 85 and a bulk data storage circuit 87. The entire system is manually interfaced by a keyboard 90, a monitor 92, a mouse 94, a plotter 96 and a printer 98.

Figure 11:
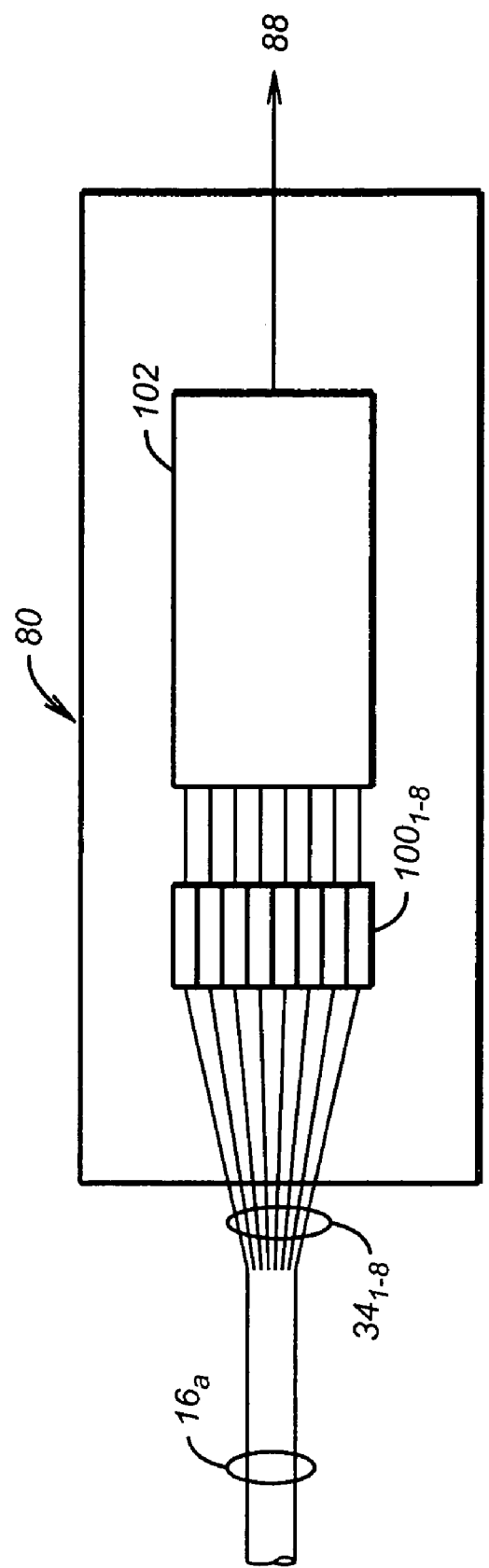
FIG. 11 is a functional schematic of a communications module for a CRU.

The communication modules 80 for the CRU 18 are illustrated schematically by FIG. 11 to include line isolators $100_{1-8}$ for each of the eight communication conduits $34_{1-8}$ and a data controller 102.

There are several distinctive characteristics of the software programs that control the invention operation. These distinctive characteristics cooperate to overcome several obstacles or inefficiencies inherent in prior art systems. One of these inefficiencies is an occurrence of large time lapses between data packets resulting in a reduction in the amount of line equipment that can be accessed in a given time period. Another inefficiency arises from the complex relationship between (1) data cable length, (2) data transmission bit rate and (3) data generation rate.

To address the prior art inefficiency of data rate transmission and to reduce the interval between data packets, the operational procedure of the invention includes a signal protocol by which the digital data packets are assembled and queued for transmission from the numerous RAMs to the CRU 18. This procedure generally includes transmission of an Interrogate Command from the CRU to the LTUs 14. The LTUs relay the Interrogate Command on toward the RAM units along each of the receiver line communication conduits 30 and 31. Respective to the pair of communication conduits 30 and 31 in a single receiver line 12, the two Interrogate Commands are independently timed. They may or may not be simultaneously emitted. Although both of the communication conduits 30 and 31 in a single receiver line 12 are connected to each RAM in the respective receiver line, the response each RAM will make to the connection is normally different.

Referring to FIG. 2, an Interrogate Command $A_0$ originates from the CRU 18 and is carried along communication conduit $34_1$ of base line 16 to LTU $14_1$, for example. The LTU $14_1$ relays the Interrogate Command $A_0$ along conduit $30_1$ to R-1/RAM 1 Upon receipt, the R-1/RAM 1 begins immediately to sequentially transmit along the communication conduit $30_1$, back to the LTU $14_1$, the data packet containing the data of all geophone system channels 32 (FIG. 5) connected to R-1/RAM 1. Significantly, the signal $A_0$ is not carried further along communication conduit $30_1$ than R-1/RAM 1. When signal $A_0$ is received by R-1/RAM 1, a timing delay is initiated by the RAM communication module 40 for the relay transmission of Interrogate Command $A_1$ along communication conduit $30_1$ from R-1/RAM 1 to R-1/RAM 3 via the repeater circuitry in R-1/RAM 2. The length of this time delay is variable as a function of numerous system and project parameters. In particular, the time delay is most strongly influenced by the number of geophone system channels connected to a particular RAM (i.e. 4, 6 or 8), the cable type and length, the number of repeater RAMs and the transmission bit rate between the RAMs. The design philosophy of the retransmission delay of Interrogate Command $A_0$ is to coordinate transmission of the last data packet from R-1/RAM 1 with arrival of the first data packet from R-1/RAM 3 at R-1/RAM 1 and to minimize the inter-packet stream gap between the successive signal streams. Although the Interrogate Command $A_1$ is received by R-1/RAM 2, the signal is merely repeated on to R-1/RAM 3.

When the Interrogate Command $A_0$ is received by R-1/RAM 1, transmission of the data packets respective to the geophone system channels reporting to R-1/RAM1 (up to 8, for example) begins immediately. However, execution of the data packet signal requires a finite time period. A portion of this finite time period is the delay interval for the relay transmission of Interrogate Command $A_1$ by R-1/RAM 1.

While the data packet from R-1/RAM 1 is being transmitted back to the LTU $14_1$, Interrogate Command $A_1$ advances to R-1/RAM 3 to initiate a corresponding data packet transmission from that RAM. Immediately, transmission of the R-1/RAM 3 data packets begins along the segment of communication conduit $30_1$ between R-1/RAM 3 and R-1/RAM 1 that has carried Interrogate Command $A_1$. The origination of Interrogate Command $A_1$ is timed to make the first elements of the data packet from R-1/RAM 3 arrive at R-1/RAM 1 just after the last of the R-1/RAM 1 data packet is transmitted.

An Interrogate Command $B_0$ transmitted from the CRU 18 independently of Interrogate Command $A_0$ is relayed by LTU 14 along line communication conduit $31_1$ to R-1/RAM 1. Upon receipt of the Interrogation Command $B_0$, R-1/RAM 1 merely relays the signal on to R-1/RAM 2. R-1/RAM 2 begins transmission of a respective data packet to the LTU $14$, along the segment of communication conduit $31_1$ between R-1/RAM 2 and R-1/RAM 1. Upon receipt of the data packet, R-1/RAM 1 merely repeats the data packet signals to the LTU $14_1$.

The Interrogate Command delay at each of the RAMs is not a fixed value but is potentially variable for each RAM depending on the number of analog channels reporting to a respective RAM, the number of repeater RAMs between the active RAMs and other factors affecting transmission time. Although the preferred embodiment of the invention provides for 8 geophone system channels 32 to each RAM, the respective CPU 46 may be programmed to accommodate any number of channels less than 8, also. Moreover, there is no rule of nature that sets the maximum number of analog channels at 8. This is simply a matter of equipment design and engineering practicalities.

It should also be noted that the communication conduit 30 or 31 for a particular RAM may be changed from one to the other. Such a step may be required in the event of a broken connection or continuity in an intended communication conduit. However, in the event of such a change, the Interrogate Command delay time at the affected RAM may be altered.

Of especial note is a logical break capability of each RAM to be programmed for the termination rather than re-transmission to the next RAM of an Interrogate Command. This capability allows the receiver lines to be looped and thus have cable connections to two LTUs 14. Functionally, however, in a given programmed configuration, each RAM will operate with only one pair of communication conduits 30/31 respective to a single, designated, LTU 14. In one example, as represented by FIG. 1, the continuity of geophone row T3 is interrupted between RAMs R-3/RAM 1 and R-2/RAM 4 by an insurmountable obstacle such as a river or sheer cliff. Consequently, the Interrogate Command from base line communication conduit $34_3$ that would normally be transmitted to R-2/RAM 4 from LTU $14_3$ is, instead, terminated by the LTU. Cooperatively, the Interrogate Command from LTU $14_2$ that would normally be terminated at R-2/RAM 3 is transmitted further via jumper cable 17 to R-2/RAM 4 in geophone row T3.

In the similar example shown in FIG. 2, the obstacle is represented by the logical break line P-P across conduits $30_2$ and $31_2$ between R-2/RAM 2 and R-2/RAM 3. Interrogate commands $C_0$ and $D_0$ from the CRU 18 are relayed by LTU $14_2$. Interrogate Command $C_0$ is received by R-2/RAM 1 and delayed for retransmission to R-2/RAM 3 as Interrogate Command $C_1$. Because of a logical break command to R-2/RAM 2, Interrogate Command $C_1$ is not issued. Meanwile, Interrogate Command $D_1$ is relayed through R-2/RAM 1 to R-2/RAM 2 for the R-2/RAM 2 geophone data. However, no retransmission signal $D_1$ is issued by R-2/RAM 2. The R-2/RAM 3 geophone data is reported along conduit $30_1$ via jumper cable 17 in response to a delay of Interrogate Command $A_2$ from R-1/RAM 3.

Although this result may obviously be accomplished by a physical disconnection of the communication conduits along the line P-P between R-2/RAM 2 and R-2/RAM 3, the need for such reporting reassignment may not always be apparent at the time the RAMs are distributed. Moreover, certain RAMs may fail after distribution and require replacement, repair or omission. With the present invention, the options of omissions and revised connections may be exercised from the CRU 18 as compared to the prior art options of repair or replacement that require a physical return to the respective RAM locations.

The logical break capacity of the invention may be accomplished by direct Commands (originated by the CRU) to the CPUs 46 respective to the RAMs. The CPUs 46 program the respective RAMs to cause them to selectively prevent the retransmission of Interrogate Command By strictly defining the sequencing of data packets based on the network configuration, the position of any data packet within the sequence may be used to determine which RAM created that data packet. And because the data packet sent in response to one Interrogate Command contains data samples that were created proximate the time of the Interrogate Command's arrival at the creating RAM, the time the data packet was created need not be explicitly stated within the data packet. The time of creation is implicitly knowable by its position within the overall data stream arising from the Interrogate Command Thus, both the RAM of origin and the time of creation of any data packet can be implicitly determined. This reduces the amount of data that must be explicitly written within the data packet. Therefore the total amount of data that is transmitted is reduced accordingly. This aids in the optimization of seismic telemetry and makes the system more efficient and cost effective.

The multiple base line communication conduits, e.g. conduits $34_1$ through $34_8$ and their respective receiver lines are each made to independently follow the methods as described above for sequencing data packets by the actions of the base line units and RAMs. Thus multiple data trains, one per base line communication conduit, exist simultaneously and may be operated in parallel, optimizing total transmission capacity.

Data packet integrity along communication conduits is affected by transmission rate, transmission power, cable type and cable length. As cable length increases so does the attenuation. Attenuation is greater as the transmission rate increases. To optimize the transmitted signal definition, the transmission bit rate and transmission power must be tuned for the length of the communication conduit.

Data bit definition relates to the ability of the receiving instrument to distinguish a data bit in the received signal continuum. Due to transmission line losses, data bit definition will decay over the length of the transmission line. At some point along the line length, the data bit pulse that was transmitted has decayed beyond distinction from random noise anomalies. Using a lower transmission bit rate, the distance may be extended over which reliable communication may occur. Also, using greater power in transmission may extend this transmission distance.

The ability to control the power of transmission is a feature of the preferred embodiment of this invention. The control is exercised from the CRU and determines the power level of transmission used by the RAMs and LTUs. The power level is increased as required for greater distances of transmission and decreased for lesser distances. As different cable lengths and types may be used on one project, there may be different transmission power settings invoked for different RAMs within the network, and the power level used by RAMs may differ from that used for LTUs. Power of signal transmission may be set differently for forward transmission toward the CRU and reverse transmission (away from the CRU). Power settings depend on transmission characteristics of the communication conduits of the cables, length being a primary characteristic, but other characteristics such as nature of the conductors also influences the power required and hence the optimum setting. It is generally beneficial to conserve power by only using sufficient power to ensure reliable communication but not excessive power. This prolongs battery life in the remotely distributed RAMs and LTUs.

Determination of optimum power settings is done experimentally for different types and lengths of cables and the CRU is programmed to use these settings for the given cable, in the preferred embodiment. Power settings are controllable independently of frequency of transmission. However, optimum power settings will be different for different frequencies of transmission, hence the CRU is programmed to recognize different optimum settings for different frequencies of transmission, as well as for different types and lengths of communication conduits.

By conserving battery power, productivity and cost effectiveness of the system are enhanced over that available from prior art.

Figure 13:
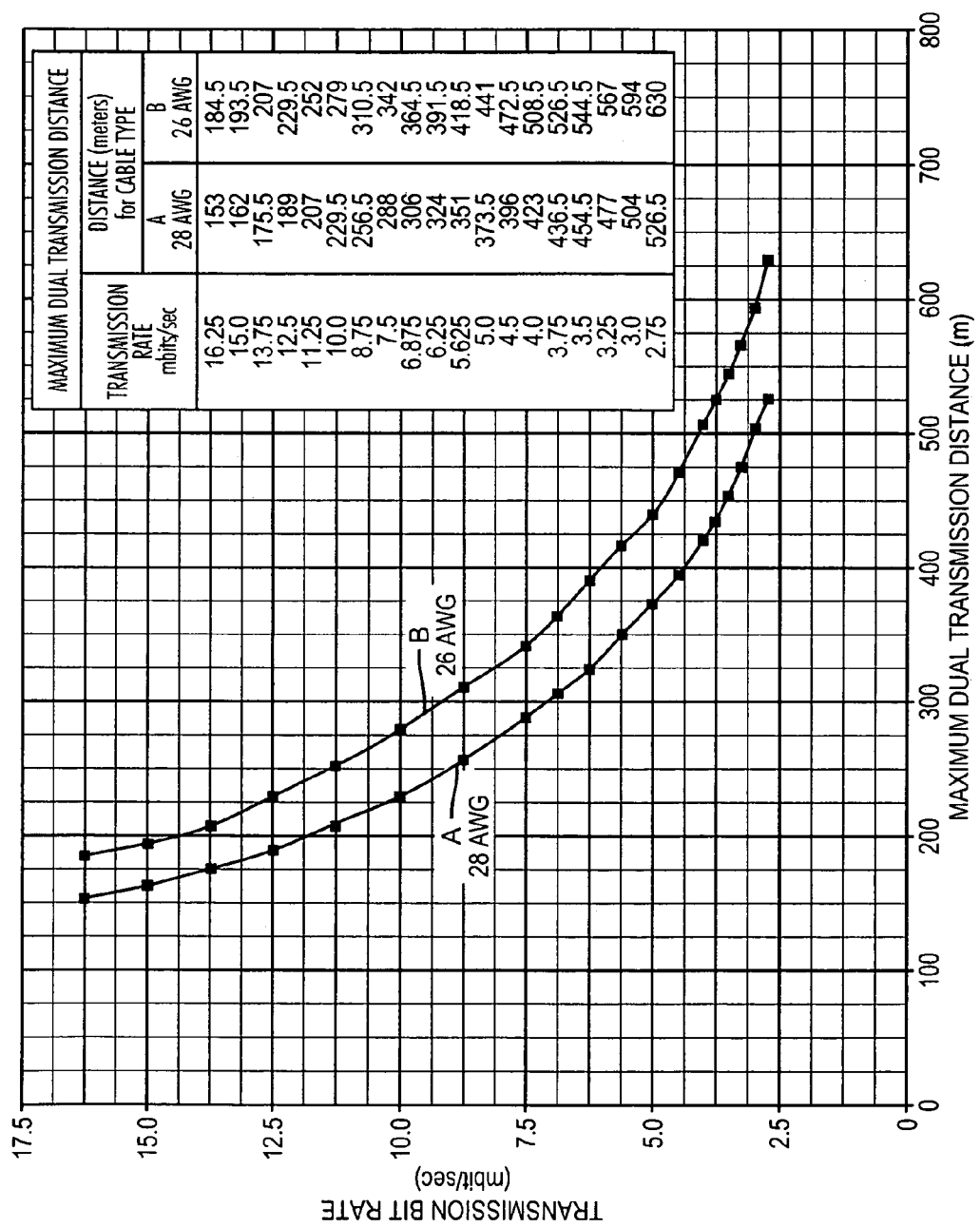
FIG. 13 is a data table and corresponding graph correlating cable length and signal transmission rate for a comparison of two types of cable.

The graph and associated table of FIG. 13 illustrate the operation of the present interrogation signal strategies as described above with two cables of differing conductor size and construction. This FIG. 13 graph plots the relation of transmission bit rate and cable length at the limits of signal definition. To be noted from this comparison is the influence that cable construction has upon data transmission capacity.

For example, a 28 AWG conductor of construction "A" will transmit reliably discernable data over a cable length of 288 meters at 7.5 mbits per second. Comparatively, a 26 AWG conductor of construction "B" may transmit reliable data over a cable length of 342 meters at the same transmission rate; a 54 meter extension that represents a 15% advantage.

The advantages of the invention are further illustrated by the tabulated data of FIG. 14. Here, the capacity of the system is organized into 3 groups respective to the number of geophone channels connected to each RAM in an array. Specifically, the data of Group I corresponds to an equipment distribution matrix that connects 8 geophone analog channels 32 to a single RAM. The Group II data corresponds to an equipment matrix having 6 geophone analog channels 32 connected to a single RAM. Group III data corresponds to a 4-channel connection.

Referring to the schematic of FIG. 1, the TO/Cable (takeouts per cable)_column of the FIG. 14 table shows the preferred maximum number of analog geophone channel connections to a receiver line cable. The TO Interval (take-out interval) is the distance, in meters, between adjacent analog connections along a cable length. The Weight column, is, in pounds, the weight of a corresponding cable of the tabulated length. The Distance/RAM column is the special distance, in meters, between adjacent RAMs in a receiver line. The Cable Length column is, in meters, the length of a corresponding cable.

The 8 columns of data respective to 8 Sampling Frequency values (i.e. Interrogation Frequency), 500 Hz, 400 Hz, etc., correspond to the maximum number of analog channels 32 that may be connected to a single receiver line of the tabulated length. The XMIT Rate column corresponds to the transmission bit rate_charging the respective receiver line. A specific number of analog channels 32 per receiver line listed by FIG. 14 relates to the corresponding Sampling Frequency column and XMIT Rate row.

FIG. 1 depicts a typical land 3D seismic survey with receiver lines and base lines that are perpendicular to the receiver lines. In some types of 3D surveys the distance between receiver lines may be significantly less than the distance between RAMs along the receiver lines. In this situation it is advantageous in terms of optimizing base line telemetry to be able to select a higher transmission bit rate_than the rate selected to optimize receiver line telemetry, because the cable segments connecting LTUs may be much shorter than the cable segments connecting RAMs. The CRU therefore, elects to use an appropriate higher rate of transmission for the base lines, setting it independently from the receiver line transmission rate. By using a higher transmission rate the base line capacity is increased and more channels may be accommodated on one base line communication conduit. Using a lower transmission rate on the receiver line communication conduit may be advantageous in particular survey projects because it allows a greater distance between RAMs and hence fewer total RAMs to cover a given area.

Thus, in the preferred embodiment, the transmission rate of the base line may be set to be higher, lower or the same as the receiver line transmission rate. The system sets the transmission rates to be used under the control of the operator at the CRU and the CRU programs each device in the network accordingly.

Seismic surveys have spatial and temporal sampling requirements that are a function of the local geology, geophysical objectives, seismic noise and signal characteristics and other factors. Sampling density requirements in time and space are both affected and in a similar manner. Seismic surveys that have very shallow geologic targets generally have the potential to retain signals at relatively high frequency, e.g. 250 Hz. However to successfully image the shallow targets at up to 250 Hz requires relatively dense spatial sampling as well as dense time sampling. Conversely, deep geologic targets have the potential to retain only lower frequency signal, e.g. up to 50 Hz. Imaging deep targets thus requires less dense time sampling (to define up to 50 Hz) but beneficially also requires less dense spatial sampling.

As an example, a first seismic survey targeting very shallow geologic horizons may require very dense time sampling at a high sampling rate of 500 Hz (to preserve with fidelity 250 Hz signal). To maintain reliable signal definition, a short separation distance between adjacent RAMs is appropriate. From the table of FIG. 14, an extreme layout would connect 1984 analog channels in a single receiver line to one side of an LTU. Cooperatively, the signal transmission rate (XMIT Rate) should be set at about 16.25 Mbits per second. These analog channels could have maximum take-out intervals of 17 meters along a maximum single cable length of 136 meters. Only one cable would span between adjacent RAMs which are also separated by a maximum of 136 meters. At each take-out point, the cable channel is broken and a geophone set is connected to an analog conduit line from the take-out point. A single analog conduit is broken twice and reports in opposite directions to respective RAMs whereby each RAM in the array is connected to 8 analog channels.

In the preceding example, although only 1984 channels may be connected along the receiver line to one side of the LTU, another 1984 channels may be connected along an extension of the receiver line if it is connected to the opposite side of the LTU. Thus the operator may in practice utilize double the number of channels per receiver line with respect to the number of channels shown in the table, if he follows this practice.

A subsequent survey targeting deep geologic layers with the same equipment may require a very sparse sub-surface sampling that is distributed over a large area. Long distances between geophone groups and accordingly wide spacing between RAMs may be appropriate for such a survey. Referring to FIG. 14, by adjusting the RAM sampling rate to about 100 Hz and setting a transmission rate of about 3.5 mbits per second; this low density survey could accommodate 416 analog channels per receiver line (or 932 if receiver lines are connected on both sides of the LTU). The RAMs could be spaced along the line at 528 meter intervals and connected to receive only 4 analog channels per RAM. Geophone take-out intervals along the data cable in this case may be a maximum of about 132 meters.

Thus, the adjustable sampling rate and signal transmission rate of the present invention, along with variability in the number of channels per RAM, allows optimization of the equipment investment for varying survey requirements. A variable bit rate translates directly into operational and logistical advantages in the field. The transmit power control feature of the present invention is one more tool the user has to make data transmission more robust under varying survey conditions, while optimizing power consumption. Data packet transmission control minimizes the time gaps between data packet groups according to the cable type and lengths used in the network. This benefit provides the survey crew with close to 100% time utilization of the cable with extra time available for more channels to be added to the line resulting in higher communication conduit limits.

In the preferred embodiment of the system, the CRU 18 software is programmed to understand the 3-dimensional earth's surface and the location of geographic features, both natural and man-made, as well as the location and operating status of all items of the seismic data acquisition equipment. The CRU software understands the configuration and interconnections of the network of RAMs, receiver-line cable, LTUs, base-line cables and the CRU. The system operator is provided a substantially true-scale map view of all of this information as exemplified in FIG. 18. The network connections may be established and modified at any time by the operator or automatically by the software at the request of the operator. In this way the desired subset of the total set of deployed RAMs may be made active to record and transmit seismic data when required to do so by the operator. Standard computer tools including keyboard, mouse, touchpad and touch screen may be provided as tools to the operator to assist him to manipulate the network to achieve the geophysical objectives. The operator may request the system software to optimize the network configuration to take best advantage of the communication capacity of the individual equipment items to reduce the required transmission time to a minimum.

Looping of receiver lines (by joining ends of adjacent pairs of receiver lines using jumper cables 17) is a recommended practice in the preferred embodiment so that in event of failure of any RAM or breakage in the receiver line cable, connection to the CRU may be re-established by use of the bidirectional communication capability of the RAM. The operator is notified on the map screen of the failure and needs simply to re-direct the otherwise stranded RAMs to communicate in the opposite direction to reach the CRU. This is done by re-positioning the logical break in the receiver line. This is illustrated by the schematics of FIGS. 15 and 16.

Figure 15:
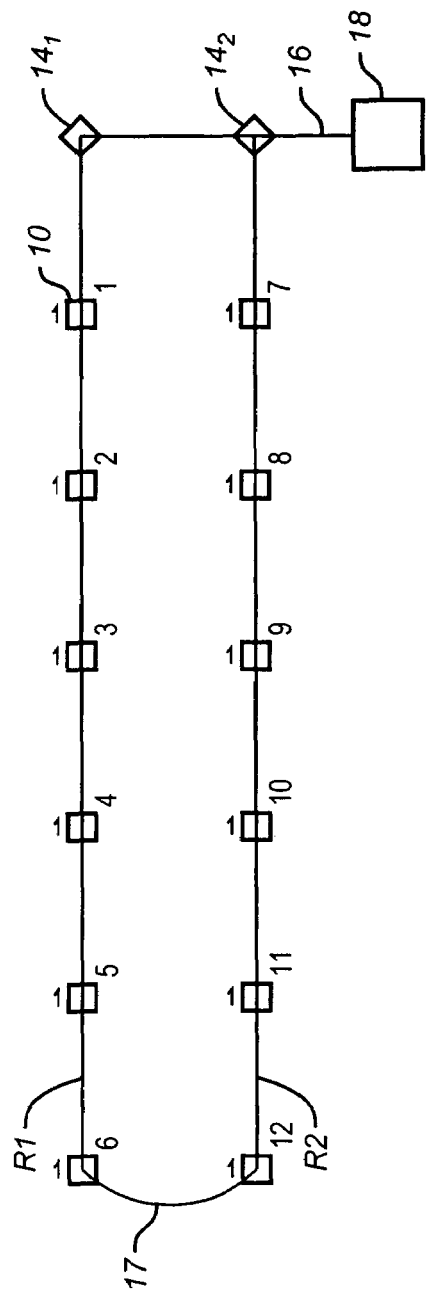
FIG. 15 is a diagram showing typical equipment layout and signal flow routing for the invention.

The originally expected data transmission routing is shown by FIG. 15 wherein the data of RAMs 1-6 is transmitted along receiver lines R-1 to LTU 14$_1$. The data of RAMs 7-12 is transmitted along receiver line R-2 to LTU 14$_2$. Although RAM 6 is physically connected to RAM 12 by loop 17, the loop is off-line to the respective R-1 and R-2 Interrogate Command transmissions from RAMs 6 and 12.

Figure 16:
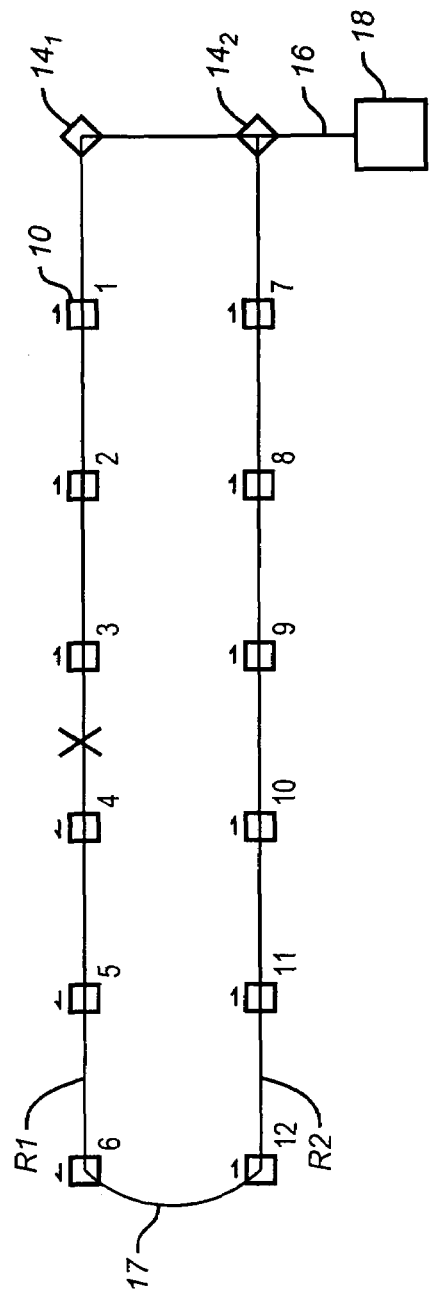
FIG. 16 is the diagram of FIG. 15 but with a revised signal flow routing due to a receiver line break.

After the equipment array has been positioned and connected, unexpected circumstances cause a signal continuity interruption along receiver line R-1 between RAM 3 and RAM 4 as shown by the X on FIG. 16. Responsively the operator of the present invention terminates the R-1 Interrogate Command retransmission at RAM 3 (by insertion of a logical break), activates the R-2 Interrogate Command from RAM 12 and also terminates the R-2 Interrogate Command from RAM 4.

Failure of one of the two communication conduits in a receiver line cable during transmission will not result in loss of data because of two key aspects of the system, (1) the storage of data in the memory of the RAM until the CRU confirms receipt of the data, and (2) the ability of the system to transmit all of the data over the remaining receiver line communication conduit. Although throughput capacity of the cable is cut in half, no data is lost.

Similarly, if a base line loses a portion of its communication conduits, for example due to physical damage during operation, all data may be directed over the remaining conduits. The flexible network design allows this adaptability to unanticipated conditions.

Data storage is also available in the LTU (as it is with the RAM) which allows saving of data while it awaits re-transmission to the CRU.

Figure 12:
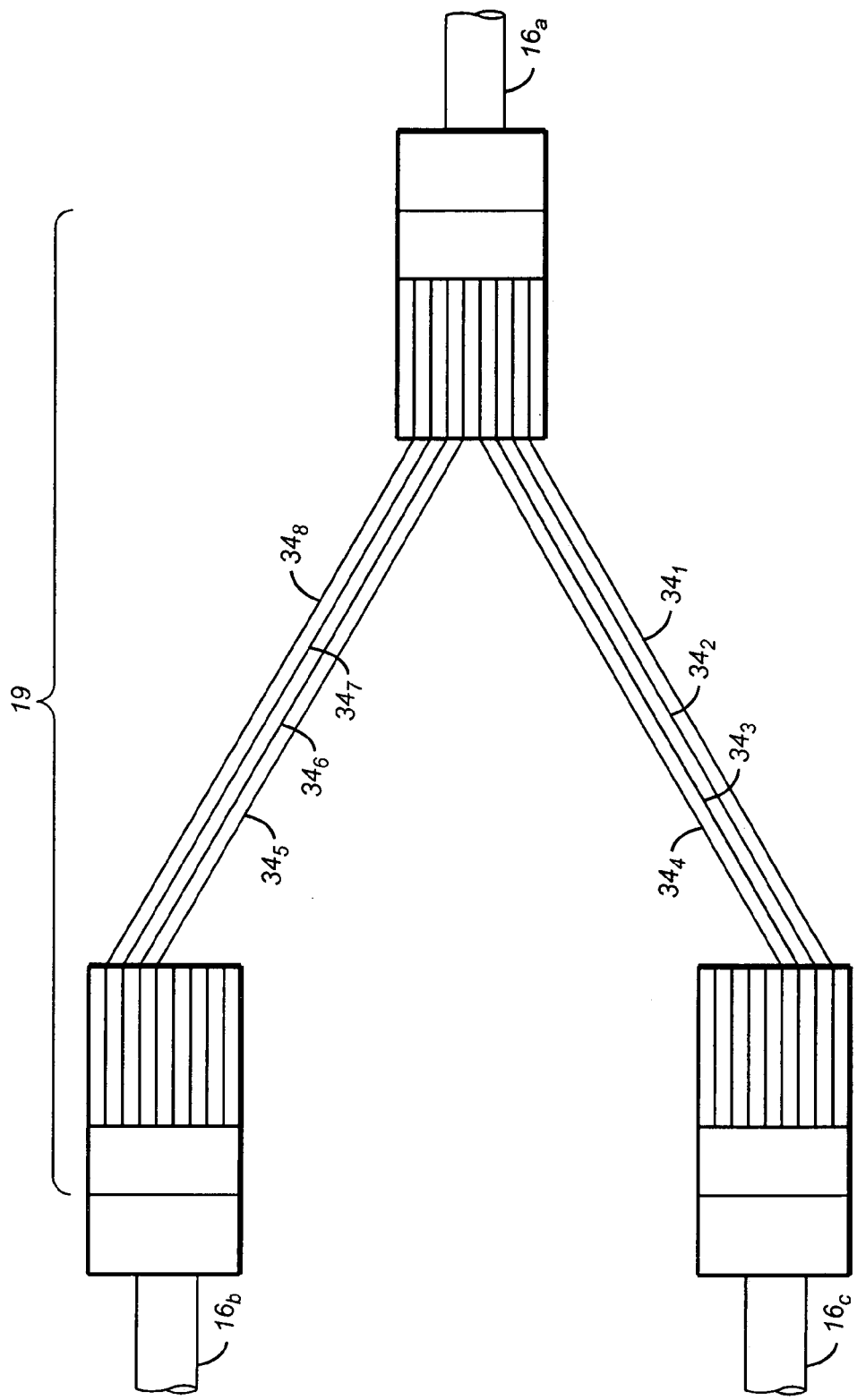
FIG. 12 is a functional schematic of a base line splitter.
Figure 17:
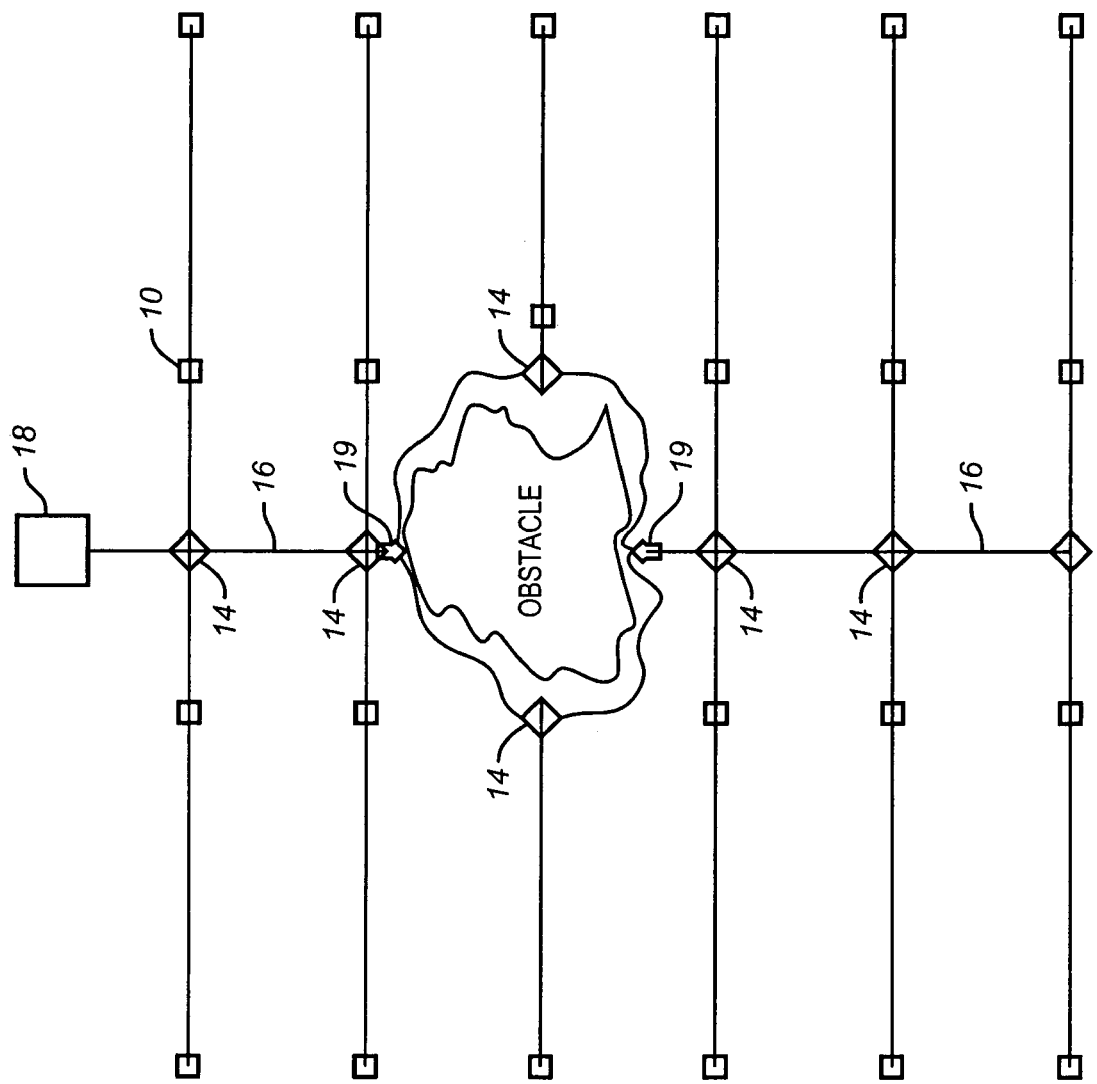
FIG. 17 is a schematic illustration of a typical base line splitter application.

The capacity of the base line to communicate seismic data is provided by eight (8) independent communication conduits. In addition to providing redundancy useful in overcoming failure of some of the conduits as described immediately above, this design facilitates the distribution of base-line capacity around both sides of physical obstacles. This is illustrated in FIG. 17. The base line needs to be connected to receiver lines on both sides of the obstacle. In prior art systems this would inevitably require the provision of two complete base lines distributed all the way from the CRU to the maximum extent of the area to be covered, an unnecessary burden in the preferred embodiment. Using the base line splitter device 19, shown in FIG. 12, the capacity of the single base line from the CRU may be positioned on both sides of the obstacle. On the far side of the obstacle the base line may be re-joined by use of another base-line splitter device 19. The eight selected communication conduits may be spread evenly, four to each side, or in any combination totaling to eight. Conduits not selected at the split are not connected and are unused around the obstacle. The base line could be designed with a number of communication conduits different from eight without changing the principles of this method, of course.

Instead of requiring two complete base lines from the CRU to the edge of the recording area, one suffices, except at the obstacle itself, resulting in a significant savings in labor and equipment. The basic concept of providing base lines with sub-dividable capacity makes this achievable. Prior art systems that use a high capacity base line cannot achieve this savings and are more subject to total loss of transmission capacity due to equipment failure.

The preferred embodiment also provides inter-connectability of network devices to make the total network more flexible and adaptable to different layout requirements. Either a base line cable or a receiver line cable may be connected to any port of the LTU. An LTU may be connected to a receiver line between any pair of RAMs. Physical receiver lines may be connected at both ends to base lines, or to the same base line at different LTUs. Base lines may be split and rejoined. Receiver lines may be used to carry base line telemetry.

Figure 18:
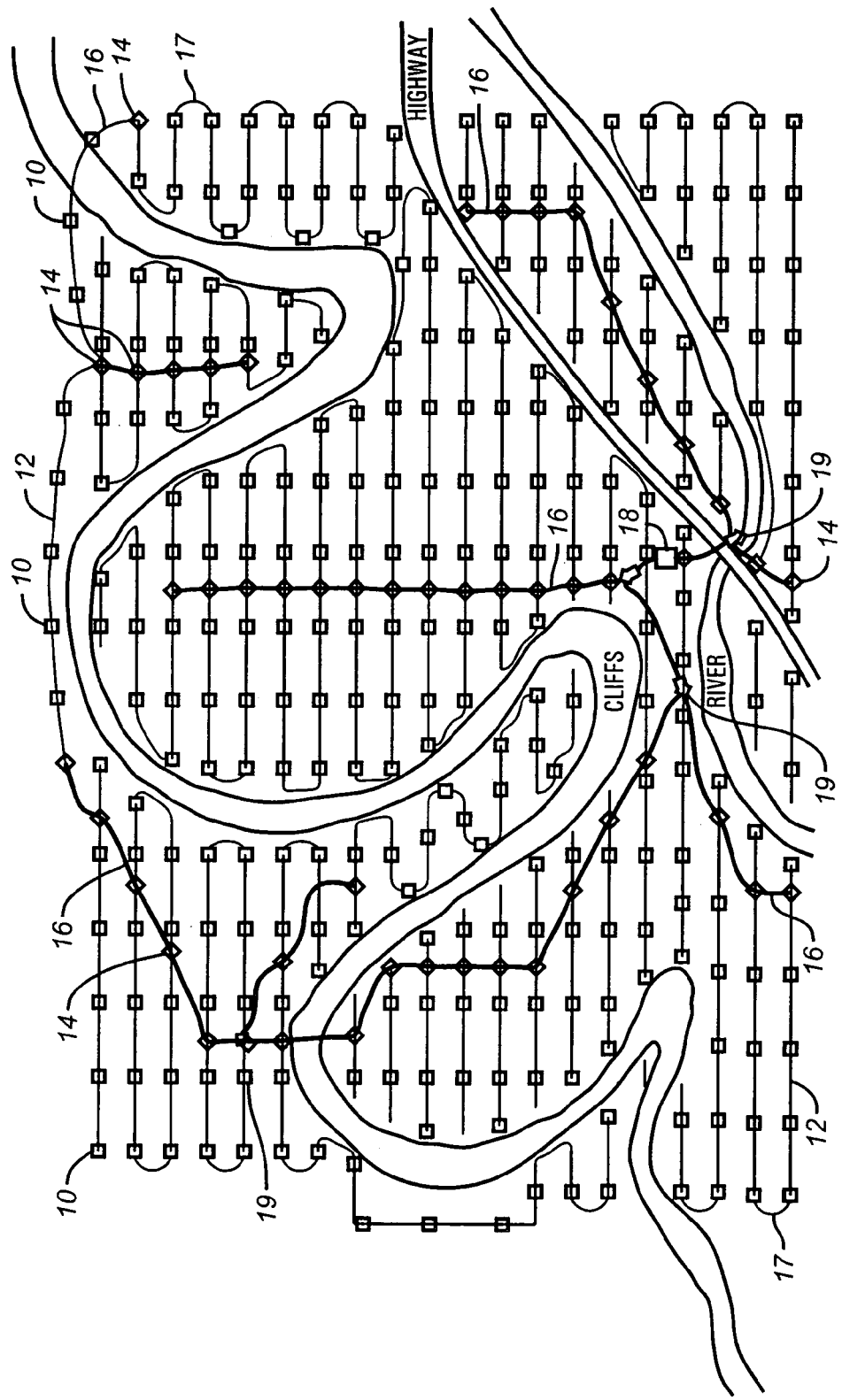
FIG. 18 is a typical map display of a seismic equipment field layout used to overcome physical barriers, superimposed upon a topographical map.

FIG. 18 illustrates the benefits to seismic data acquisition operations of the inter-connectability of the preferred embodiment. The operator with the guidance of the system software, uses the true scale map of the area and the seismic equipment, and builds the network in the optimum way, given the nature of the obstructions.

In this example there are three kinds of physical obstacles that obstruct the layout of the desired ideal grid of seismic receiver lines. There is a river running across the area, a highway inhibits access and a series of sandstone cliffs blocks access. The operator at the CRU views the map as depicted in FIG. 18. This map changes as often as necessary to depict the current equipment configuration. As the operator constructs the network he has the advantage of viewing the exact locations of equipment items with respect to the physical features of the terrain. He also sees the operability status of equipment items, for example whether a particular base line and the receiver lines with RAMs connected to it are operating within specifications. He makes decisions which best utilize available equipment to build the network.

The operator has chosen to establish a separate base line south of the highway to reduce safety concerns by limiting the number of cables and workers on the highway. He has also chosen to establish a base line running north and to split it several times, one part staying below the cliffs, the other climbing the cliff at the easiest point, where it divides again and again to take advantage of the topography.

At the NE corner of the area, the operator has chosen to use receiver line cable with RAMs used solely as repeaters and with no geophones connected to these RAMs. Here the receiver line cable has been used to carry the base line telemetry and therefore acts as a base line with only two communication conduits. An LTU at the end of this section of cable joins a receiver line with the RAMs at the NE extremity of the area. This illustrates the dual roles the RAMs may serve, i.e. as pure repeaters to overcome distance limitations, and as data acquisition devices for the geophone arrays. Also, the ability of the receiver line cable to substitute for base line cable, although with reduced number of communication conduits, is another feature which increases system flexibility and hence productivity. Prior art systems do not have these capabilities.

Jumper cables 17 are used to connect segments of receiver line cable to create loops at the ends of pairs of receiver lines. This allows extension of receiver lines but also may provide alternate transmission paths that can be used to overcome cable breaks and failure of one of the RAMs in the pair of receiver lines.

Thus the operator with the aid of the map view and layout tools provided by the software, devises the most practical and cost-effective way to acquire the seismic data. The flexibility of the network improves ease and safety of deployment, but also improves productivity after deployment, as the multiple paths available from each RAM to the CRU allow continued production without need for re-deployment in event of equipment damage or failure.

FIG. 18 depicts the CRU and a typical RAM in the network that is separated from the CRU and connected to it by a base-line cable with a series of LTUs and a receiver line with several intervening RAMs. A desirable objective of all seismic data acquisition systems is that amplitude samples are recorded by all RAMs in the network that, in effect are all taken at the exact same instant. It is not necessary, however, to actually sample the amplitudes simultaneously if a means is available to know the varied actual times of sampling respective to each RAM and a means is provided to calculate the probable values of amplitude at the ideal sample time. The preferred embodiment of the invention incorporates unique means to accomplish the sampling objective stated above.

The method of the invention recognizes that there are two categories of errors that cause the time of an amplitude sample to differ from the intended ideal time. The first category of errors includes those caused by the successive delays in the network as the Interrogate Command travels from the CRU through the series of intervening network elements to the RAM. The second category of error occurs within the RAM.

Transmission delays in the base line cable, LTUs, receiver line cable, and intervening RAMs all contribute to the first category of error. These delays may be either physically measured in the laboratory prior to the seismic survey and tabulated in CRU system software for each type of network element, or in the case of deliberately-imposed delays of Interrogate Command retransmission, may be computed by the system software. The CRU is programmed to simply sum up these predictable delays for the given network configuration and thereby compute the total predictable transmission delay for each RAM in the network. This predicted value equates to the total delay between the time the Interrogate Command is sent from the CRU until the given RAM takes the corresponding initial amplitude samples for its channels at the beginning of the period of recording.

In the preferred embodiment, after the first sample of a seismic record is taken, the RAM continues to take samples at increments of time equal to the programmed sample period, for example every 2 ms, according to the RAM's own internal clock. The RAM's internal clock may be a relatively low-powered and drift-prone clock, such as Temperature-Compensated Crystal Oscillator (TCXO), with a drift such as 2.5 parts per million (PPM). However the system master clock in the CRU is much more accurate and also consumes much more power. Typically it might have a drift rate such as 0.02 PPM. The system master clock may be periodically corrected using an external time source such as from a GPS clock.

Freeing the RAM from dependence upon receiving each and every Interrogate Command from the CRU prior to taking the next sample has advantages in terms of system efficiency and in error prevention in case of sporadic errors in transmission from the CRU to the RAM and is a novel feature of the invention.

Figure 19:
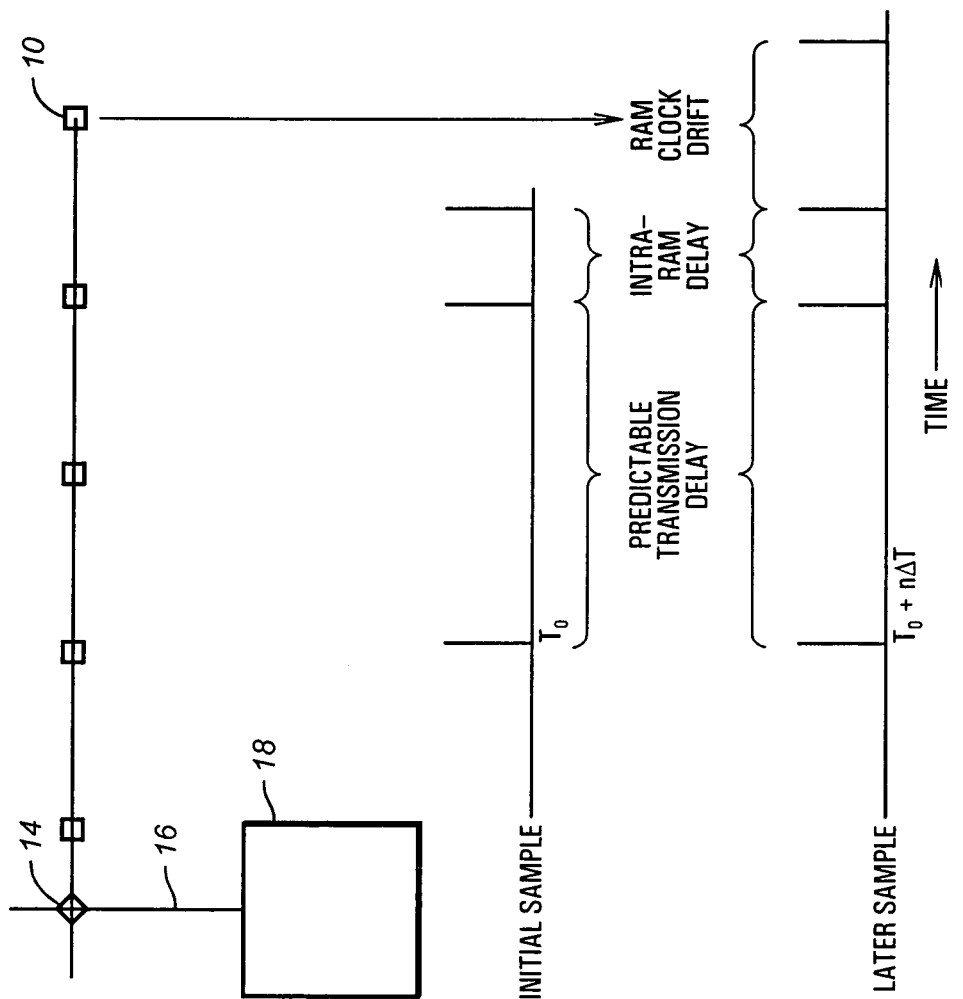
FIG. 19 is a graph of interrogate command time skew.

As the RAM proceeds to take amplitude samples after the initial sample in the recording period, say every 2 ms according to its clock, the samples increasingly may drift away from the intended sampling times due to increasing buildup of error in its clock. The error may become so great as to invalidate and render useless the amplitude data when the length of the recording period is great if the method of the preferred embodiment is not used. FIG. 19 illustrates the buildup of clock drift error between the time of the initial sample and the time of a later sample.

This RAM clock drift can be monitored in the following way which is the method of the preferred embodiment.
1. The RAM stores its clock times periodically on a predetermined schedule of receipt of Interrogate Commands, e.g. every 100 receipts, beginning with the first Interrogate Command at the beginning of a period of recording.
2. At the end of the period of recording, or when requested by the CRU, the RAM sends back its table of stored clock times to the CRU.
3. The CRU, knowing the times on its internal clock that correspond to the times in the table containing the RAM clock times, and knowing the total predictable delay for the RAM, constructs a drift curve for the RAM's clock consisting of values of RAM clock time versus master clock time.

Any Interrogate Command which fails in transmission and is thus not received by the RAM will decrease its count by one and cause a diagnostic shift in the drift curve. Unless transmission errors are rampant, the method includes detection and correction of such Interrogate Command transmission errors.

Figure 20:
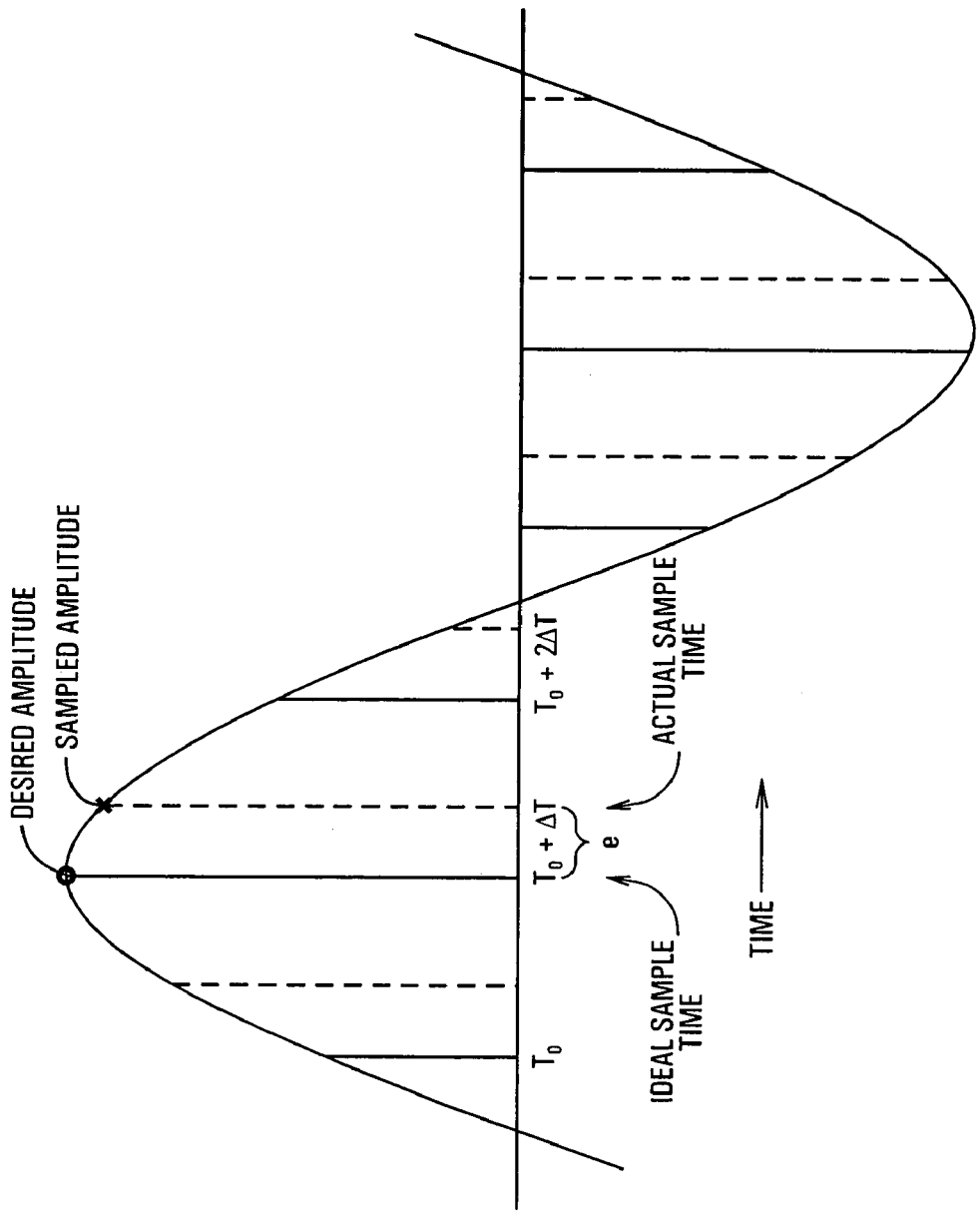
FIG. 20 is a seismic wave graph illustrating seismic signal skew and signal amplitude interpolation.

Using the drift curve and the total predicted delay for each channel of each RAM, the CRU computes the actual times at which each RAM took its amplitude samples. FIG. 20 shows the two sets of times, the desired times and the actual times, marked off against a representative analog seismic waveform. The actual samples provide a basis for estimation of the amplitudes at the intended sample times according to the master clock. A simple regression or curve-fitting method may be used to compute the estimated amplitude values at the intended times. Alternatively, more elaborate methods well-known in the art such as (sin X)/X or optimum least-mean-square-error (LSME) interpolation filtering may be used. The CRU thus computes amplitude values for the ideal intended time of sampling for each recorded channel, effectively achieving the objective.

Accounting for drift of the RAM clock may be of minimal importance if the duration of the recording period is short, for example, 10 sec. For very long periods of recording such as 300 sec or longer, it is essential, and therefore is invaluable in implementation of continuous or quasi-continuous recording required by methods such as Vibroseis Slip-Sweep.

An average time error for a channel, computed over a time-window of relatively short duration, e.g. 10 sec, may be used to time-shift all of the amplitude samples within this window, if the amount of relative drift of the RAM clock is insignificant within the window (e.g. <0.2 ms).

The RAM clock drift being different for each of the many RAMs in the recording system dictates that the original amplitude samples for different RAMs to be taken at differing times. In this respect the recording system in this invention is an asynchronous system rather than a synchronous system as in the prior art. Furthermore the deliberately-imposed delays in transmission of Interrogate Commands contribute to the asynchronous nature of the system (while at the same time allowing maximization of data throughput along base lines and receiver lines).

The novel method of correcting the time samples enables an asynchronous system to achieve the desired sampling which is in effect synchronous. Because the system is initially asynchronous it is able to achieve network and system efficiencies not possible. with synchronous systems.

Although our invention has been described in terms of specified embodiments which are set forth in detail, it should be understood that this is by illustration only and that the invention is not necessarily limited thereto. Alternative embodiments and operating techniques will become apparent to those of ordinary skill in the art in view of the present disclosure. Accordingly, modifications of the invention are contemplated which may be made without departing from the spirit of the claimed invention

The invention claimed is:

1. A method of remotely configuring a data packet routing pattern within a seismic survey transmission network comprising the steps of serially connecting a first plurality of seismic data acquisition modules by first receiver-line means to a base-line; serially connecting a second plurality of seismic data acquisition modules by second receiver-line means to a base-line; connecting a first seismic data acquisition module in said first receiver-line means to a second seismic data acquisition module in said second receiver-line means via a data transmission conduit; said seismic data acquisition modules generating and transmitting along said respective receiver-line means toward a data recording and control unit streams of digital data packets containing respective samples of seismic amplitude values corresponding to an instant in time; determining by said data recording and control unit a first data packet flow route toward said data recording and control unit from said seismic data acquisition modules; and, changing said first data packet flow route to a second data packet flow route by command signals directed from said data recording and control unit to transmit the data packet flow stream from a selected seismic data acquisition module in said first receiver line through seismic data acquisition modules in said second receiver line.

2. The method as described by claim 1 wherein said first and second data packet flow routes are graphically displayed by a scale map projected on a computer monitor connected to said recording and control unit.

3. The method as described by claim 1 wherein the second data packet flow route determined by said command signals also defines the sequential order in which said data packets containing said seismic amplitude values will arrive at each successive seismic data acquisition module and at the central recording and control unit.

4. A method as described by claim 1 wherein the digital data packets generated by said seismic data acquisition modules rely exclusively on information implied by the sequential order of data packet receipt by said data recording and control unit for identification of the specific seismic data acquisition module that generated a respective data packet and the approximate time of generation.

5. A method as described by claim 1 wherein said command signals from said recording and control unit to change said data packet flow route are manually directed.

6. A method as described by claim 1 wherein said command signals from said recording and control unit to change said data packet flow route are automatically directed.

7. The method as described by claim 1 wherein said first and second receiver lines connecting said plurality of seismic data acquisition modules are connected to base-lines by a common base-line module.

8. The method as described by claim 1 wherein said first and second receiver lines connecting said plurality of seismic data acquisition modules are connected to base-lines by respective first and second base-line modules.

9. A method of acquiring seismic survey data comprising the steps of:

a. generating a terrestrially transmitted seismic survey event;
b. detecting seismic reflections of said event by first and second physically spaced sensors;
c. generating by said sensors, respective first and second sensor signals corresponding to said seismic reflections;
d. transmitting said sensor signals along respective first and second signal channels to respective first and second seismic signal processing modules;
e. transmitting first and second digital signals corresponding to said first and second sensor signals by said first and second seismic signal processing modules along a first digital signal flow route comprising respective first and second receiver lines, each receiver line comprising a first plurality of communication conduits, said receiver lines being connected at one end to a base-line module positioned along a base line and respective receiver line distal ends being joined to each other by a connecting conduit, said base line comprising a second plurality of communication conduits, said digital signals being further transmitted along said base line to a signal recording and control system; and,
f. revising, by command signals from said signal recording and control system, said first digital signal flow route to a second digital signal flow route that includes transmission of said first digital signals along said connecting conduit and said second receiver line to said base-line module.

10. A method as described by claim 9 wherein said base line is constructed by combining a plurality of communication conduits of the same physical type and signal carrying capacity as the communication conduits in said receiver line.

11. A method as described by claim 10 wherein a first portion of said base line communication conduits is physically separated from a second portion at a first geographic location to allow distribution of base line communication capacity in two portions respectively branching along separate pathways, said two portions of base line communication conduits being physically rejoined at a second geographic location.

12. A method as described by claim 9 wherein said receiver line is constructed with a plurality of substantially identical and essentially parallel communication conduits.

13. A method as described by claim 9 in which routing of digital signals along said receiver and base lines to said signal recording and control system is selected by command signals from said signal recording and control system.

14. A method as described by claim 9 wherein said base line is constructed with a plurality of substantially identical and essentially parallel communication conduits.

15. A method as described by claim 9 wherein said first and second seismic signal processing modules are responsive to signal commands from said signal recording and control system to change from performance of seismic signal processing module functions to performance of base line module functions.

16. A method of remotely configuring a data packet routing pattern within a seismic survey transmission network comprising the steps of serially connecting a first plurality of seismic data acquisition modules by first receiver-line means to a first base-line module; connecting said first base-line module to a data recording and control unit by first base-line means; serially connecting a second plurality of seismic data acquisition modules by second receiver-line means to a second base-line module; connecting said second base-line module to said data recording and control unit by second base-line means; connecting a first seismic data acquisition module in said first receiver-line means to a second seismic data acquisition module in said second receiver-line means via a linking data transmission conduit; said seismic data acquisition modules generating and transmitting along said receiver-line means digital data packets containing respective samples of seismic amplitude value corresponding to an instant in time; determining by said data recording and control unit a first data packet flow route toward said data recording and control unit from said seismic data acquisition modules; and, changing said first data packet flow route to a second data packet flow route by command signals directed from said data recording and control unit, said second data packet flow route including the transmission of data packets from said first seismic data acquisition module through said linking conduit to said second base-line module.

17. A method as described by claim 16 wherein said command signals from said data recording and control unit to change said data packet flow route are manually directed.

18. A method as described by claim 16 wherein said command signals from said data recording and control unit to change said data packet flow route are automatically directed.

19. A method of remotely configuring a data packet routing pattern within a seismic survey transmission network comprising the steps of serially connecting a plurality of data acquisition modules distributed along each of a plurality of receiver-line cable means to a base-line, each data acquisition module having one or more seismic energy sensors operatively connected thereto, each receiver-line cable means comprising a plurality of parallel communication pathways; connecting said base-line to a data recording and control unit; said data acquisition modules generating and transmitting along respective receiver-line cable means digital data packets containing respective samples of seismic amplitude value corresponding to an instant in time; serially connecting a first group of said data acquisition modules respective to a first receiver-line cable means by a first of said parallel communication pathways for adding data packets generated by said first group of data acquisition modules to a first data packet flow stream; serially connecting a second group of said data acquisition modules respective to said first receiver-line cable means by a second of said parallel communication pathways for adding data packets generated by said second group of data acquisition modules to a second flow stream of data packets; relay transmitting by said second group of data acquisition modules those data packets generated by said first group of data acquisition modules; relay transmitting by said first group of data acquisition modules those data packets generated by said second group of data acquisition modules; and revising the data acquisition module constituency of said first and second groups by command signals directed from said data recording and control unit along said first and second parallel communication pathways.

20. A method as described by claim 19 wherein said command signals from said data recording and control unit to revise said first and second group constituencies are manually directed.

21. A method as described by claim 19 wherein said command signals from said data recording and control unit to revise said first and second group constituencies are automatically directed.

* * * * *